United States Patent [19]
Seraji et al.

[11] Patent Number: 5,737,500
[45] Date of Patent: Apr. 7, 1998

[54] MOBILE DEXTEROUS SIREN DEGREE OF FREEDOM ROBOT ARM WITH REAL-TIME CONTROL SYSTEM

[75] Inventors: Homayoun Seraji, La Crescenta; David Lim, Walnut; Thomas S. Lee, Los Angeles, all of Calif.

[73] Assignee: California Institute of Technology, Pasadena, Calif.

[21] Appl. No.: 431,361

[22] Filed: Apr. 28, 1995

Related U.S. Application Data

[63] Continuation-in-part of Ser. No. 849,629, Mar. 11, 1992, Pat. No. 5,430,643, and Ser. No. 231,597, Apr. 20, 1994, Pat. No. 5,550,953.

[51] Int. Cl.$^6$ ............................ G05B 19/04; G05B 19/18
[52] U.S. Cl. ................ 395/86; 564/167.01; 318/568.11; 318/568.24; 901/9; 901/15; 395/98; 395/97
[58] Field of Search ............... 901/1, 9, 15; 318/568.11, 318/568.24; 395/80, 86, 98, 97

[56] References Cited

U.S. PATENT DOCUMENTS

| | | | |
|---|---|---|---|
| 4,999,553 | 3/1991 | Seraji | 318/561 |
| 5,430,643 | 7/1995 | Seraji | 364/167.01 |
| 5,550,953 | 8/1996 | Seraji | 395/98 |

OTHER PUBLICATIONS

Farrell, J., Thompson, J., Karlen, J. Vold, Havard, Eismann, P. "Modular, Configurable, Kinematically Redundant Manipulators" 1990 Japan–USA Symposium On Flexible Automation, Japan, Jul. 9–13, vol. 1, 1990.

Anderson, K. and Angeles, J. "Kinematic inversion of robotic manipulators in the presence of redundancies," Intern. Jour. of Robotics Research, 1989, vol. 8, No. 6, pp. 80–97.

Baillieul, J. "Kinematic programming alternatives for redundant manipulators," Proc. IEEE Intern. Conf. on Robotics and Automation, St. Louis, Mar. 1985, pp. 722–728.

Colbaugh, R. and Seraji, H. and Glass, K.L. "Obstacle avoidance for redundant robots using configuration control," Journal of Robotic Systems, 1989, vol. 6, No. 6, 721–744.

Dubey, R.V., Euler, J.A. and Babcock, S.M., "An efficient gradient projection optimization scheme for a 7 DOF redundant robot with spherical wrist," Proc. IEEE Intern. Cong. on Robotics and Automation, Philadelphia, Apr. 1988, pp. 28–36.

(List continued on next page.)

*Primary Examiner*—Tariq R. Hafiz
*Assistant Examiner*—Jeffrey S. Smith
*Attorney, Agent, or Firm*—Michaelson & Wallace

[57] ABSTRACT

The present invention is a mobile redundant dexterous manipulator with a seven-degree-of-freedom robot arm mounted on a 1 degree-of-freedom mobile platform with a six-degree-of freedom end effector including a real-time control system with multiple modes of operation. The manipulator-plus-platform system has two degrees-of-redundancy for the task of hand placement and orientation. The redundancy resolution is achieved by accomplishing two additional tasks using a configuration control technique. This mobile manipulator with control system allows a choice of arm angle control or collision avoidance for the seventh task, and platform placement or elbow angle control for the eighth task. In addition, joint limit avoidance task is automatically invoked when any of the joints approach their limits. The robot is controlled by a processor employing a 6-by-7 Jacobian matrix for defining location and orientation of the end effector.

31 Claims, 19 Drawing Sheets

OTHER PUBLICATIONS

Gilbert, E.G. and Johnson, D.W. "Distance functions and their applications to robot path planning in the presence of obstacles," IEEE Jour. of Robotics and Automation, 1985, vol. 1, No. 1, pp. 21–30.

Hollerbach, J.M. "Optimum Kinematic design for a seven degree of freedom robot manipulator," Proc. 2nd Intern. Symp. on Robotics Research, Kyoto, Japan, Aug. 1984, pp. 215–222.

Klein, C.A. and Huang, C.H. "Review of pseudoinverse control for use with kinematically redundant manipulators," IEEE tran. Systems, Man and Cybernetics, 1983, vol. SMC–13 No. 3, pp. 245–250.

Krentz–Delgado, K. Long, M. and Seraji, H. "Kinematic analysis of 7 DOF anthropomorphic arms", Proc. IEEE Intern. Conf. on Robotics and Automation, Cincinnati, May 1990, vol. 2, pp. 824–830.

Lenarcic, J. and Umek, A. "Experimental evaluation of human arm kinematics", Proc. 2nd Intern. Symp. on Experimental Robotics, Toulouse, France, Jun. 1992.

Liegeois, A. "Automatic Supervisory Control of the Configuration and Behavior of Multibody Mechanism", IEEE Trans. Systems, Man and Cybernetics, 1977, vol. SMC–7, No. 12, pp. 868–871.

Maciejewski, A. and Klein, C. "Obstacle Avoidance for Kinematically Redundant Manipulators in Dynamically Varying Enivronments", Intern. Journ. of Robotics Research, 1985, vol. 4, No. 3, pp. 109–117.

Nakamura, Y., Hanafus, H. and Yoshikawa, T. "Task–Priority Based Redundancy Control of Robot Manipulators ", Proc. 2nd Intern. Symp. on Robotics Research, Kyoto, Aug. 1984.

Schnurr, R., O'Brien, M. and Cofer, S. "The Goddard Space Flight Center Robotics Technology Testbed ", Proc. Second NASA Conf. on Space Telerobotics, Pasadena, Jan. 1989, vol. 3, pp. 491–500.

Seraji, H. "Configuration Control of Redundant Manipulators: Theory and Implementation", IEEE Trans. on Robotics and Automation, 1989, vol. 5, No. 4, pp. 472–490.

Seraji, H. and Colbaugh, R. "Improved Configuration Control for Redundant Robots", Journal of Robotic Systems, 1990, vol. 7, No. 6, pp. 897–928.

Wampler, C. II, "Inverse Kinematic Functions for Redundant Manipulators", Proc. IEEE Intern. Conf. on Robotics and Automation, Raleigh, Apr. 1987, pp. 610–617.

Wampler, C. and Liefer, L. "Applications of damped least-–squares methods to resolved–rate and resolved–acceleration control of manipulators", ASME Journ. Dyn. Syst., Meas. and Control, 1988, vol. 110, No. 1, pp. 31–38.

Whitney, D.E. "Resolved Motion Rate Control of Manipulators and Human Prostheses", IEEE Trans. Man–Machine Systems, 1969, vol. MMS–10, No. 2, pp. 47–53.

Whitney, D.E. "The mathematics of coordinated control of prosthetic arms and manipulators", AME Journ. Dyn. Syst., Meas. and Control, 1972, vol. 94, No. 14, pp. 303–309.

OnLine Collision Avoidance for Redundant Manipulators, K. Glass, R. Colbaugh, D. Lim, and H. Seraji, Proc. IEEE Intern Conf. on Robotics and Automation, pp. 36–43, May 2–6 1993, Atlanta, Georgia.

Remote Surface Inspection System, S. Hayati, J. Balaram, H. Seraji, W.S. Kim, K. Tso, and V. Prasad, Proc. IEEE Intern. Conf. on Robotics and Automation, pp. 875–882, May 2–6 1993, Atlanta, Georgia.

Kinematic analysis of 7DOF anthropomorphic arms, K. Kreutz–Delgado, M. Long, and H. Seraji, , Proc. IEEE Intern. Conf. on Robotics and Automation, pp. 824–830, 1990, Cincinnati, Ohio.

Inverse Kinematic Solutions with Singularity Robustness for Robot Manipulator Control, Y. Nakamura and H. Hanabusa, ASME Journal of Dynamic Systems, Measurement, and Control, 108, 1986.

Configuration Control of Redundant Manipulation: Theory and Implementation, H. Seraji, IEEE Trans. on Robotics and Automation, 5(4):472–490, 1989.

An On–Line Approach to Coordinated Mobility and Manipulation, H. Seraji, Proc. IEEE Intern. Conf. on Robotics and Automation, pp. 28–33, May 2–6 1993, Atlanta, Georgia.

Improved Configuration Control for Redundant Robots, H. Seraji and R. Colbaugh, Journal of Robotic Systems, 7(6):897–928, 1990.

Taslc Space Velocity Blending for Real Time Trajectory Generation, Volpe, Proc. IEEE; Intern. Conf. on Robotics and Automation, pp. 680 687, May 24, 1993, Atlanta, Georgia.

Applications of Damped–Least–Squares Methods to Resolved Rate and Resolved–Acceleration Control of Manipulators, C. Wampler and L. Leifer, ASME Journal of Dynamic Systems, Measurement, and Control, 110:31–38, 1988.

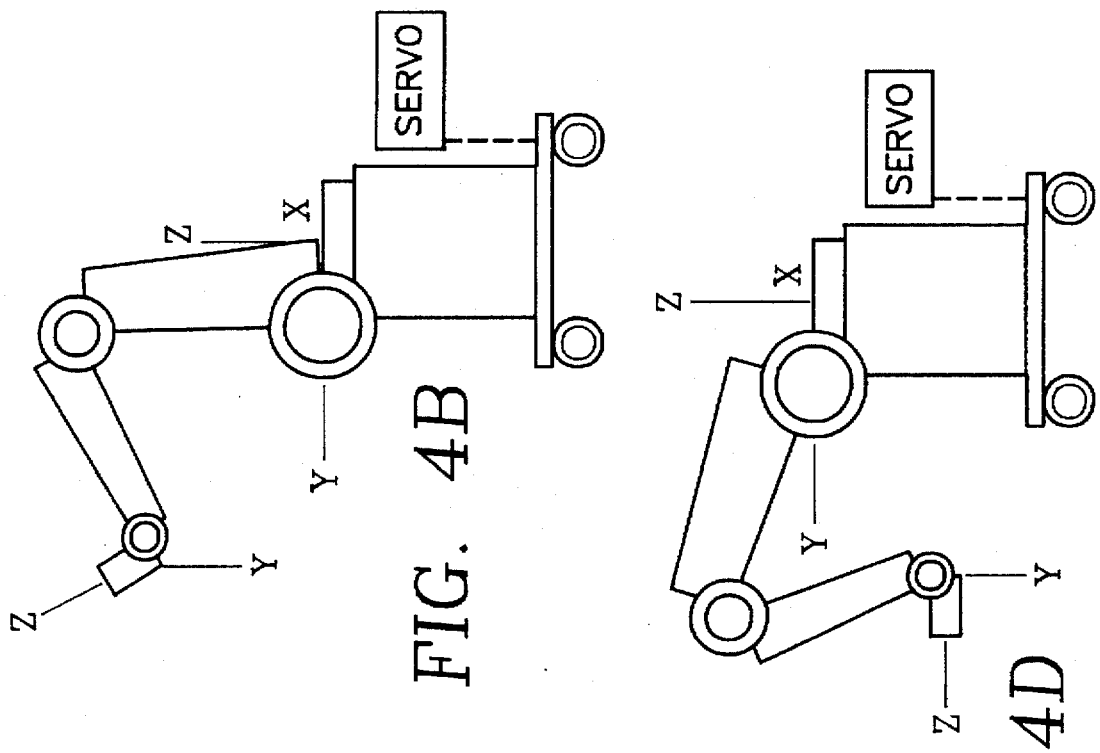
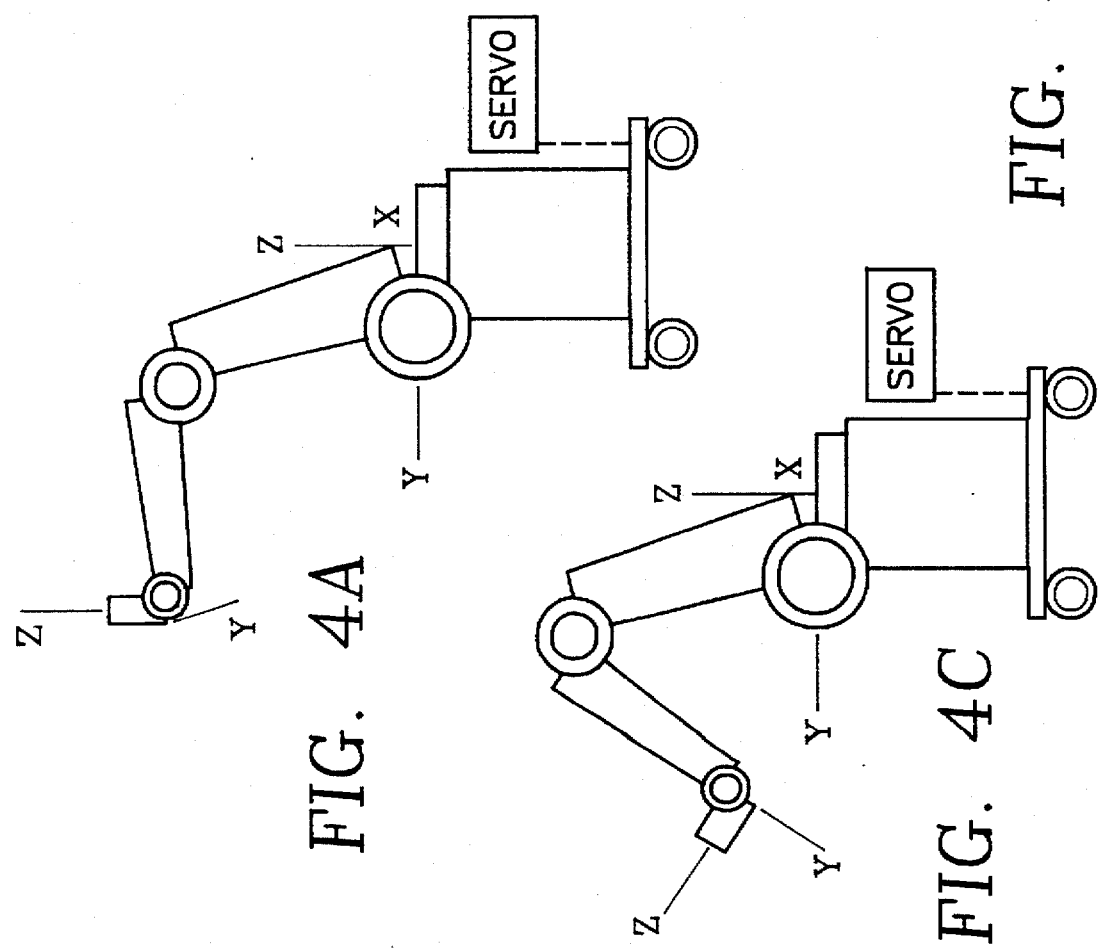

MOBILE DEXTEROUS SIREN DEGREE OF FREEDOM ROBOT ARM WITH REAL-TIME CONTROL SYSTEM

CROSS-REFERENCE TO RELATED APPLICATIONS

This application is a continuation-in-part of Ser. No. 07/849,629 filed Mar. 11, 1992, now U.S. Pat. No. 5,430,643. This application is also a continuation-in-part of Ser. No. 08/231,597 filed Apr. 20, 1994, now U.S. Pat. No. 5,550,953.

BACKGROUND OF THE INVENTION

1. Origin of the Invention

The invention described herein was made in the performance of work under a NASA contract, and is subject to the provisions of Public Law 96-517 (35 U.S.C. 202) in which the Contractor has elected to retain title.

2. Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Technical Field

The invention is related to the use of the configuration control method disclosed in U.S. Pat. No. 4,999,553 by one of the inventors herein to the control of seven degree of freedom robot arms, using a kinematic approach.

4. Background Art

U.S. Pat. No. 4,999,553, the disclosure of which is hereby incorporated herein by reference, discloses a configuration control method employed in the present invention.

REFERENCES

The background of the present invention is discussed below relative to the following references by referring to them by the bracketed numbers associated with each reference as follows:

[1] J. M. Hollerbach: "Optimum kinematic design for a seven degree of freedom manipulator," Proc. 2nd Intern. Symp. on Robotics Research, Kyoto, Japan, August 1984, pp. 215–222.

[2] J. Lenarcic, and A. Umek: "Experimental evaluation of human arm kinematics," Proc. 2nd Intern. Symp. on Experimental Robotics, Toulouse, France, June 1991.

[3] D. E. Whitney: "Resolved motion rate control of manipulators and human prostheses," IEEE Trans. Man-Machine Systems, 1969, Vol. MMS-10, No. 2, pp. 47–53.

[4] A. Li'egeois: "Automatic supervisory control of the configuration and behavior of multibody mechanisms," IEEE Trans. Systems, Man and Cybernetics, 1977, Vol. SMC-7, No. 12, pp. 868–871.

[5] R. V. Dubey, J. A. Euler, and S. M. Babcock: "An efficient gradient projection optimization scheme for a 7 DOF redundant robot with spherical wrist," Proc. IEEE intern. Conf. on Robotics and Automation, Philadelphia, April 1988, pp. 28–36.

[6] Y. Nakamura and H. Hanafusa: "Task priority based redundancy control of robot manipulators," Proc. 2nd intern. Symp. on Robotics Research, Kyoto, August 1984.

[7] A. A. Maciejewski and C. A. Klein: "Obstacle avoidance for kinematically redundant manipulators in dynamically varying environments," Intern. Journ. of Robotics Research, 1985, Vol. 4, No. 3, pp. 109–117.

[8] C. W. Wampler: "inverse kinematic functions for redundant manipulators," Proc. IEEE Intern. Conf. on Robotics and Automation, Raleigh, April 1987, pp. 610–617.

[9] J. Baillieul: "Kinematic programming alternatives for redundant manipulators," Proc. IEEE intern. Conf. on Robotics and Automation, St. Louis, March 1985, pp. 722–728.

[10] K. Anderson and J. Angeles: "Kinematic inversion of robotic manipulators in the presence of redundancies," Intern. Jour. of Robotics Research, 1989, Vol. 8, No. 6, pp. 80–97.

[11] H. Seraji: "Configuration control of redundant manipulators: Theory and implementation," IEEE Trans. on Robotics and Automation, 1989, Vol. 5, No. 4, pp. 472–490.

[12] J. D. Farrell, J. M. Thompson, J. P. Karlen, H. I. Vold and P. H. Eismann: "Modular, configurable, kinematically redundant manipulators," Proc. Japan-USA Symposium on Flexible Automation, Kyoto, July 1990, pp. 303–308.

[13] J. J. Craig: Robotics—Mechanics and Control/, Addison Wesley Publishing Company, New York, 1986.

[14] D. E. Whitney: "The mathematics of coordinated control of prosthetic arms and manipulators," ASME Journ. Dyn. Syst., Meas. and Control, 1972, Vol. 94, No. 14, pp. 303–309.

[15] K. Kreutz, M. Long, and H. Seraji: "Kinematic analysis of 7 DOF anthropomorphic arms," Proc. IEEE Intern. Conf. on Robotics and Automation, Cincinnati, May 1990, Vol. 2, pp. 824–830.

[16] R. Colbaugh, H. Seraji, and K. Glass: "Obstacle avoidance for redundant robots using configuration control," Journal of Robotic Systems, 1989, Vol. 6, No. 6, pp. 721–744.

[17] H. Seraji and R. Colbaugh: "improved configuration control for redundant robots," Journal of Robotic Systems, 1990, Vol. 7, No. 6, pp. 897–928.

[18] Y. Nakamura and H. Hanafusa: "Inverse kinematic solutions with singularity robutness for robot manipulator control," ASME Journ. Dyn. Syst., Meas. and Control, 1986, Vol. 108, No. 3, pp. 163–171.

[19] C. W. Wampler and L. J. Leifer: "Applications of damped least-squares methods to resolved-rate and resolved-acceleration control of manipulators," ASME Journ. Dyn. Syst., Meas. and Control, 1988, Vol. 110, No. 1, pp. 31–38.

[20] H. Seraji: "Task-based configuration control of redundant manipulators," Journal of Robotic Systems, 1992, Vol. 9, No. 3.

[21] E. G. Gilbert and D. W. Johnson: "Distance functions and their application to robot path planning in the presence of obstacles," IEEE Journ. of Robotics and Automation, 1985, Vol. 1, No. 1, pp. 21–30.

[22] C. A. Klein and C. H. Huang: "Review of pseudo-inverse control for use with kinematically redundant manipulators," IEEE Trans. Systems, Man and Cybernetics, 1983, Vol. SMC-13, No. 3, pp. 245–250.

[23] R. Schnurr, M. O'Brien, and S. Cofer: "The Goddard Space Flight Center Robotics Technology Testbed,"

Proc. Second NASA Conf. on Space Telerobotics, Pasadena, January 1989, Vol. 3, pp. 491–500.

1. Introduction

It has been recognized that robot arms with seven or more degrees-of-freedom (DOF) offer considerable dexterity and versatility over conventional six DOF arms [1]. These high-performance robot arms are kinematically redundant since they have more than the six joints required for arbitrary placement of the end-effector in the three-dimensional workspace. Kinematically redundant arms have the potential to approach the capabilities of the human arm, which also has seven independent joint degrees-of-freedom [2].

Although the availability of the "extra" joints can provide dexterous motion of the arm, proper utilization of this redundancy poses a challenging and difficult problem. Redundant manipulators have an infinite number of joint motions which lead to the same end-effector trajectory. This richness in the choice of joint motions complicates the manipulator control problem considerably. Typically, the kinematic component of a redundant manipulator control scheme must generate a set of joint angle trajectories, from the infinite set of possible trajectories, which causes the end-effector to follow a desired trajectory while satisfying additional constraints, such as collision avoidance, servo-motor torque minimization, singularity avoidance, or joint limit avoidance. Developing techniques to simultaneously achieve end-effector trajectory control while meeting additional task requirements is known as the redundancy resolution/problem, since the motion of the manipulator joints must be "resolved" to satisfy both objectives.

Since redundancy is an important evolutionary step toward versatile manipulation, research activity in redundancy resolution and related areas has grown considerably in recent years, [e.g. 3–10]. For the most part, researchers have been working with a set of analytical tools based on linearized differential/kinematics models. Previous investigations of redundant manipulators have often focused on local/optimization for redundancy resolution by using the Jacobian pseudoinverse to solve the instantaneous relationship between the joint and end-effector velocities. Redundancy resolution based on the Jacobian pseudoinverse was first proposed by Whitney [3] in 1969, and the null-space projection improvement was proposed by Liegeois [4] in 1977. Over the past two decades, most researchers have continued to develop variations of the pseudoinverse approach primarily because the complex nonlinear forward and inverse kinematics models has deterred further investigations into new redundancy resolution schemes. A conceptually simple approach to control of redundant manipulator configuration has been developed recently based on augmentation of the manipulator forward kinematics [11]. This approach covers a wide range of applications and enables a major advancement in both understanding and developing new redundancy resolution methods. This paper presents the applications of the configuration control approach to a large class of redundant industrial robot arms with seven degrees-of-freedom.

In addition to the applications of configuration control, the present invention also provides the remote inspection system with a mobile dexterous robotic manipulator for sensor placement including an associated multi-mode real-time control system. The mobility of the manipulator is accomplished by a motorized mobile platform.

The paper is organized as follows. Section 2 describes the kinematics of the 7 DOF Robotics Research arm and gives an overview of the configuration control approach. Various applications of the configuration control approach to the 7 DOF arm providing elbow control, collision avoidance, and optimal joint movement are given in Section 3. Section 4 describes the laboratory setup and the implementation of configuration control for real-time motion control of the 7 DOF arm, with elbow positioning for redundancy resolution.

Section 5 describes the configuration control approach for the manipulator with the motorized mobile platform. Section 6 describes the implementation of the configuration control for real-time motion control of the manipulator with the motorized mobile platform. Section 7 describes the graphics simulation of the manipulator with the motorized mobile platform. Conclusions drawn from this work are given in Section 8.

2. Motion Control of 7 DOF Arms

In this section, we describe the kinematics of the 7 DOF Robotics Research arm under study and discuss the motion control of this arm using the configuration control approach.

2.1 Kinematics of 7 DOF Robotics Research Arm

The Robotics Research (RR) arm is one of the few kinematically-redundant manipulators that is commercially available at the present time [12]. The Model K1207 RR arm has been purchased by JPL and similar models by other NASA centers for research and development of technologies applicable to the NASA Space Telerobotics Projects.

The Robotics Research arm has an anthropomorphic design with seven revolute joints, as shown in FIG. 1 and has nonzero offsets at all the joints. The arm is composed of a number of "modules" with roll and pitch motions. The shoulder joint with roll and pitch motions moves the upper-arm; the elbow joint with roll and pitch actions drives the forearm; and the wrist roll and pitch rotations together with the tool-plate roll move the hand. Essentially, the 7 DOF arm is obtained by adding the upper-arm roll as the 7th joint to a conventional 6 DOF arm design. The RR arm is supported by a pedestal at the base.

For kinematic analysis of the RR arm, coordinate frames are assigned to the links in such a way that the joint rotation $\theta_i$ is about the coordinate axis $z_i$ and the base frame $\{x_0,y_0,z_0\}$ is attached to the pedestal. The two consecutive frames $\{x_{i-1},y_{i-1},z_{i-1}\}$ with origin $O_{i-1}$ and $\{x_i,y_i,z_i\}$ with origin $O_i$ are related by the 4×4 homogeneous transformation matrix [13]

$$\begin{bmatrix} \cos\theta_i & -\sin\theta_i & 0 & A_{i-1} \\ \sin\theta_i\cos\alpha_{i-1} & \cos\theta_i\cos\alpha_{i-1} & -\sin\alpha_{i-1} & -\sin\alpha_{i-1}d_i \\ \sin\theta_i\sin\alpha_{i-1} & \cos\theta_i\sin\alpha_{i-1} & \cos\alpha_{i-1} & \cos\alpha_{i-1}d_i \\ 0 & 0 & 0 & 1 \end{bmatrix} \quad (1)$$

where $d_i$, $a_i$, and $\alpha_i$ are the link length, joint offset and twist angle respectively, given in Table 1. The transformation that relates the hand frame $\{7\}$ to the base frame $\{O\}$ is obtained as $$^0T_7 = {^0T_1^1T_2^2C_3^3C_4^4C_5^5C_6^6C_7} = \begin{pmatrix} R & \vdots & p \\ \cdots & \cdots & \cdots & \vdots & \cdots \\ 0 & 0 & 0 & \vdots & 1 \end{pmatrix} \quad (2)$$

where $R=\{r_{ij}\}$ is the 3×3 hand rotation matrix and $p=[x, y, z]^T$ is the 3×1 hand position vector with respect to the base. One common representation of the hand orientation is the triple roll-pitch-yaw Euler angles $(\rho, \beta, \gamma)$. This three-parameter representation of hand orientation is subtracted from the hand rotation matrix R as follows [13]:

$$\rho = \text{Atan2}(r_{32}, r_{33}) \quad (3)$$

$$\beta = \text{Atan2}\left(-r_{31}, \sqrt{r_{11}^2 + r_{21}^2}\right)$$

$$\gamma = \text{Atan2}(r_{21}, r_{11})$$

where Atan2 is the two-argument arc tangent function, and it is assumed that the pitch angle $\beta$ is not equal to or greater than $\pm 90°$. Therefore, the hand position and orientation can be described by the 6×1 vector $Y=[x, y, z, \rho, \beta, \gamma]^T$ the three-dimensional workspace.

The 6×7 Jacobian matrix $J_v$ relates the 6×1 hand rotational and translational velocity vector $$V = \begin{pmatrix} \omega \\ v \end{pmatrix}$$

to the 7×1 joint angular velocity vector +e,fra dot $\theta$+ee as $V = J_v \dot{\theta}$. The hand Jacobian matrix is computed using the vector cross-product form [14]

$$J_v = \begin{pmatrix} \hat{z}_1 & \hat{z}_2 & \ldots & \hat{z}_7 \\ \hat{z}_1 \times P^1 & \hat{z}_2 \times P^2 & \ldots & \hat{z}_7 \times P^7 \end{pmatrix} \quad (4)$$

where $\hat{z}_i$ is the unit vector along the z-axis of link frame $\{i\}$, and $P^i$ is the position vector from the origin $O_i$ of link frame $\{i\}$ to the origin of hand frame $\{7\}$. The Jacobian matrix in (4) can be partitioned as $$J_v = \begin{pmatrix} J_{vr} \\ \ldots \\ J_{vt} \end{pmatrix},$$

where $J_{vr}$ and $J_{vt}$ designate the rotational and translational components of the Jacobian, that is, $\omega = J_{vr} \dot{\theta}$ and $v = J_{vt} \dot{\theta}$. In order to relate the joint velocities to the rate of change of the roll-pitch-yaw angles that represent the hand orientation, the rotational Jacobian $J_{vr}$ in (4) is modified to yield [13]

$$\frac{d}{dt}\begin{pmatrix} \rho \\ \beta \\ \gamma \end{pmatrix} = \begin{pmatrix} 0 & -\text{SIN}_\gamma & \text{COS}_\gamma \text{COS}\beta \\ 0 & \text{COS}_\gamma & \text{SIN}_\gamma \text{COS}\beta \\ 0 & 0 & -\text{SIN}\beta \end{pmatrix}^{-1} J_{vr}\dot{\theta} = \Pi J_{vr}\dot{\theta} \quad (5)$$

where the transformation matrix $\Pi$ (5) maps $\omega$ to $$\begin{pmatrix} \dot{\rho} \\ \dot{\beta} \\ \dot{\gamma} \end{pmatrix},$$

and $\det[\Pi] = \text{COS } \beta \neq 0$ since $\beta \neq \pm 90°$.

From (4) and (5), we obtain the 6×7 hand Jacobian matrix $$J_6 = \begin{pmatrix} J_{vt} \\ \ldots \\ \Pi J_{vr} \end{pmatrix}$$

which relates $\dot{Y}$ to $\dot{\theta}$ as $\dot{Y} = J_e(\theta)\dot{\theta}$. It is important to note that the computational efficiency can be creased significantly by exploiting the commonality of terms between the hand transformation matrix $^0T_7$ and the hand Jacobian matrix $J_e$.

Since the Robotics Research arm has seven joints, it offers one extra degree of joint redundancy for the task of controlling the six hand coordinates. The resolution of this single degree-of-redundancy is the subject of the next section.

SUMMARY OF THE INVENTION

A seven-degree-of-freedom robot arm with a six-degree-of-freedom end effector is controlled by a processor employing a 6-by-7 Jacobian matrix for defining location and orientation of the end effector in terms of the rotation angles of the joints, a 1 (or more)-by-7 Jacobian matrix for defining 1 (or more) user-specified kinematic functions constraining location or movement of selected portions of the arm in terms of the joint angles, the processor combining the two Jacobian matrices to produce an augmented 7 (or more)-by-7 Jacobian matrix, the processor effecting control by computing in accordance with kinematics from the augmented 7-by-7 Jacobian matrix and from the seven joint angles of the arm a set of seven desired joint angles for transmittal to the joint servo loops of the arms. One of the kinematic functions constrains the orientation of the elbow plane of the arm. Another one of the kinematic functions minimizing a sum of gravitational torques on the joints. Still another one of the kinematic functions constrains the location of the arm to perform collision avoidance. Generically, one of the kinematic functions minimizes a sum of selected mechanical parameters of at least some of the joints associated with weighting coefficients which may be changed during arm movement. The mechanical parameters may be velocity errors or position errors or gravity torques associated with individual joints.

Further, the present invention also provides a mobile redundant dexterous manipulator including a real-time control system with multiple modes of operation. The manipulator is a seven degree-of-freedom arm mounted on a motorized platform. The manipulator-plus-platform system has two degrees-of-redundancy for the task of hand placement and orientation. The redundancy resolution is achieved by accomplishing two additional tasks using the configuration control technique. This mobile manipulator with control system allows a choice of arm angle control or collision avoidance for the seventh task, and platform placement or elbow angle control for the eighth task. In addition, joint limit avoidance task is automatically invoked when any of the joints approach their limits. This mobile manipulator with control system is robust to singularities, and also provides the capability of assigning weighting factors to end-effector and redundancy resolution tasks. The motion control algorithms controlling the mobile robot are executed at approximately 1.1 ms also on the VME-based chassis with two Motorola MC68040 processor boards.

BRIEF DESCRIPTION OF THE DRAWINGS

FIGS. 4a, 4b, 4c and 4d are diagrams of the robot arm of FIG. 1 in various positions of interest.

DETAILED DESCRIPTION OF THE INVENTION

Figure 1:
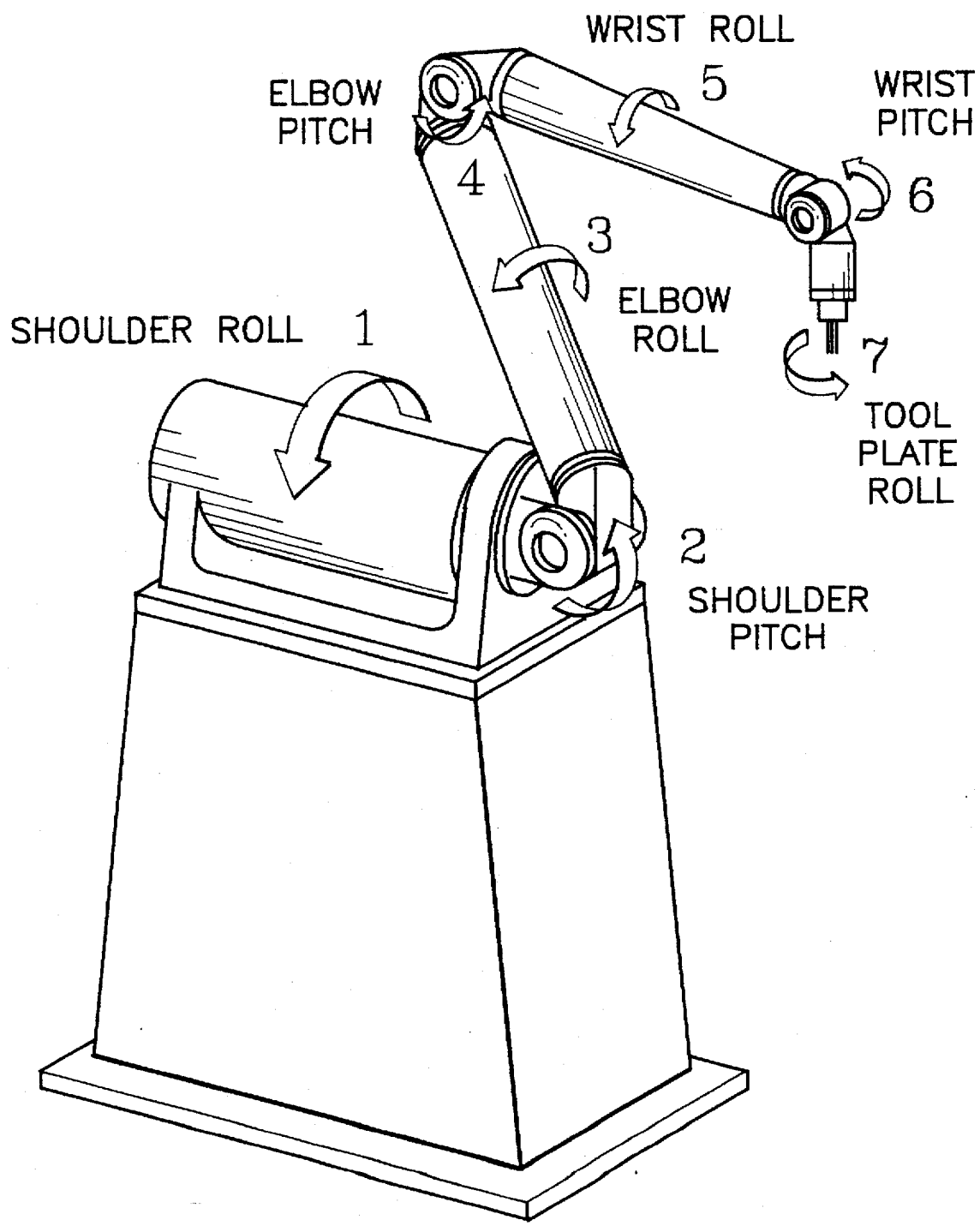
FIG. 1 is a perspective view of a seven degree of freedom robot arm of the type controlled in the present invention.

2.2 Configuration Control of the 7 DOF Arm

The configuration control approach introduced in [11] is a viable technique for resolution of redundancy and motion control of redundant manipulators. This approach is based on redundancy resolution at the position (i.e., task) level through augmentation of the manipulator forward kinematics by a set of user-defined kinematic functions $\Phi(\theta)=\{\phi_1(\theta), \ldots, \phi_r(\theta)\}$, where r is the number of redundant manipulator joints. This is contrast to the conventional Jacobian pseudoinverse methods which resolve the redundancy at the velocity (i.e., differential kinematics) level.

For the 7 DOF Robotics Research arm, the six hand position and orientation coordinates obtained in Section 2.1 are augmented by the scaler user-defined kinematic function $\phi$ to yield the 7×1 configuration vector $X=[Y^T, \phi]^T$. The redundancy resolution goal is then expressed as the additional task constraint $$\phi(\theta)=\phi_d(t) \quad (6)$$

that will be accomplished simultaneously with the basic task of controlling the hand motion $Y(\theta)=Y_d(t)$, where $\phi_d(t)$ and $Y_d(t)$ are the desired time variations of $\phi(\theta)$ and $Y(\theta)$ respectively. Since the functional forms of the kinematic function and its desired time evolution are at the user's discretion, this approach can accommodate a wide range of redundancy resolution goals such as arm posture control (i.e. elbow positioning [15]), satisfaction of task constraint (e.g. collision avoidance [16]), or optimization of a kinematic performance measure (e.g. minimal joint movement [17]). This formulation puts the redundancy resolution on the same footing as the end-effector task, and treats them equally within a common format. As a consequence, configuration control schemes ensure cyclicity (i.e., conservativeness) of arm motion, in contrast to pseudoinverse-based methods.

The configuration control approach can be implemented either as a dynamic or a kinematic control law. In the dynamic control implementation [11], the configuration controller produces the appropriate joint torques $\Gamma(t)$ using a joint-space or a task-space formulation. In the kinematic control implementation [17], the controller generates the appropriate joint angle trajectories $\theta_d(t)$ which are then used as setpoints for the low-level joint servo-loops. In this paper, we adopt the kinematic configuration control approach due to ease of implementation. Since the Robotics Research arm has non-zero joint offsets, there are no closed-form analytical inverse kinematic solutions and therefore a differential kinematics approach must be adopted. The augmented differential kinematics model of the arm is obtained as $$\dot{X}(t) = \begin{pmatrix} J_e(\theta) \\ \ldots \\ J_c(\theta) \end{pmatrix} \dot{\theta}(t) = J(\theta)\dot{\theta}(t) \quad (7)$$

where $J_e(\theta)$ is the 6×7 hand Jacobian matrix obtained Section 2.1, $$J_c(\theta) = \frac{\partial \phi}{\partial \theta}$$

is the 1×7 Jacobian matrix associated with the kinematic function $\phi$, and $J(\theta)$ is the 7×7 augmented Jacobian matrix*Note that when $\phi(\theta)$ is defined as the gradient of an objective function to be optimized, J becomes the "extended" Jacobian proposed by Baillieul [9] for redundancy resolution. Therefore, the extended Jacobian method is retrieved as a special case of the configuration control approach when the latter is implemented as a differential kinematic controller with an optimization additional task. Assuming det≠0, equation (7) is solved in discrete-time as $$\Delta\theta_d(N)=J^{-1}(\theta_n)[X_d(N+1)-X(N)] \quad (8)$$

where N is the sampling instant, $\theta$ and X are the actual values while $\theta_d$ and $X_d$ are the desired values. Note that the use of X in (8) corrects for linearization errors due to differential kinematics. The next desired joint angle is then computed from $\theta_d(N+1)=\theta_d(N)+\Delta\theta_d(N)$, and is sent as a setpoint to the joint servo-loops for tracking.

The configuration control framework allows the user to specify multiple additional tasks to be accomplished simultaneously with the basic task of hand motion. Suppose that $r(>1)$ additional task constraints are defined as $\phi_i(\theta)=\phi_{di}(t)$, $i=1, \ldots, r$. Then, the augmented differential kinematics model becomes $$X_d = \begin{pmatrix} Y_d \\ \vdots \\ \phi_{d1} \\ \vdots \\ \phi_{dr} \end{pmatrix} = \begin{pmatrix} J_e \\ \vdots \\ J_{c1} \\ \vdots \\ J_{cr} \end{pmatrix} \theta = J\theta \qquad (9)$$

The optimal (i.e. damped least-squares) solution of the over-determined set of equations (9) that has the smallest joint velocity $\|\dot{\theta}\|$ is given by [17–19] as $$\dot{\theta} = [J^T WJ + W_v]^{-1} J^T W \dot{X}_d \qquad (10)$$

or in discrete-time implementation $$\Delta\theta_d(N) = [J^T(\theta_N)WJ(\theta_N) + W_v]^{-1} J^T(\theta_N) W[X_d(N+1) - X(N)] \qquad (11)$$

where $W = \text{diag}\{W_e, W_c\}$ and $W_v$ are the $(6+r) \times (6+r)$ and $7 \times 7$ matrices of task error and joint velocity weighting factors specified by the user. Note that when $W_v = 0$, $r=1$ and $\det[J] \neq 0$, equation (8) is retrieved from (10). The acquired solution $\dot{\theta}$ (10) minimizes the scalar cost function $$L = \dot{E}_e^T W_e \dot{E}_e + \dot{E}_c^T W_c \dot{E}_c + \dot{\theta}^T W_v \dot{\theta} \qquad (12)$$

where $\dot{E}_e = \dot{Y}_d - J_e\dot{\theta}$ and $\dot{E}_c \dot{\Phi}_d - J_c\dot{\theta}$ are the basic task and additional task velocity errors. The task weighting factors $W_e$, $W_c$ enable the user to assign priorities to the different basic and additional task requirements. The joint velocity weighting factor $W_v$ allows the user to suppress large joint velocities near singularities, at the expense of small task errors. This is particularly important in redundant arm control because the complicated nature of the augmented Jacobian singularities deters any analytical characterization of the singular configurations.

Figure 2:
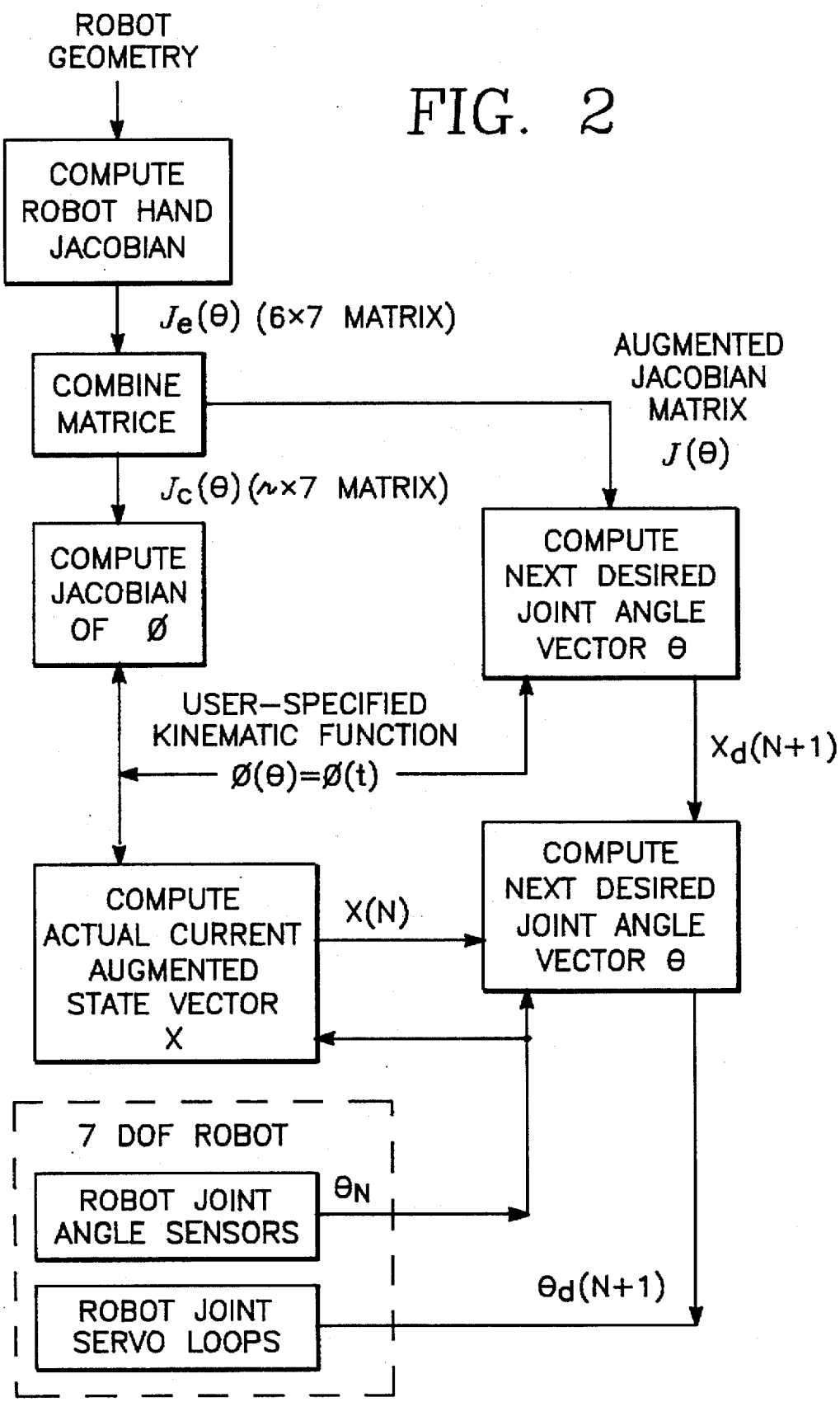
FIG. 2 is a block diagram of an architecture embodying the present invention.

An architecture corresponding to Equations (8) and (10) is illustrated in FIG. 2.

The ability to change the weighting factors on-line based on the task performance provides a general framework for incorporation of multiple constraints in redundant arm control. Equation (10) can be written as $$\dot{\theta} = \left[ W_V + J_e^T W_e J_e + \sum_{i=1}^{r} \omega_{ci} J_{ci}^T J_{ci} \right]^{-1} \left[ J_e^T W_e \dot{Y}_d + \sum_{i=1}^{r} \omega_{ci} \dot{\phi}_{di} J_{ci}^T \right] \qquad (13)$$

where $J_{ci}$ is the Jacobian related to $\phi_i$. Equation (13) shows the contribution of each additional task constraint to the optimal joint motion. This formulation can be used to "blend" multiple additional tasks or to "switch" between different additional tasks by proper selection of their weighting factors. For instance, for the 7 DOF arm, we can switch between elbow control and collision avoidance during task execution so that when the arm is far from workspace obstacles, $w_{ei}=1$ and $w_{co}=0$ and direct elbow control will take precedence. As soon as potential collision is detected (from world model or sensory data), the collision avoidance goal becomes dominant and the corresponding weighting factor $w_{co}$ creases as the arm gets closer to the obstacle, at the expense of loss of direct elbow control by setting $w_{ei}=0$. This feature is illustrated in Section 3, and is discussed in detail in [17].

The configuration control formulation can be used to meet diverse additional task constraints for redundancy resolution [20]. For instance, the redundancy can be used to control directly: a geometrical variable (such as coordinates of a point on the arm), a physical variable (e.g. a joint gravity torque), or a mathematical function (such as projected gradient of an optimization function). In the next section, we demonstrate three applications of configuration control for motion control of the 7 DOF Robotics Research arm. In each application, the single degree-of-redundancy is utilized to accomplish a different additional task objective; namely, elbow control, collision avoidance, and optimal joint movement.

3. Graphics Simulation of 7 DOF Arm Control

This section describes some of the simulations of the configuration control scheme for redundancy resolution and kinematic motion control of the Model K1207 7 DOF Robotics Research arm.

Figure 3:
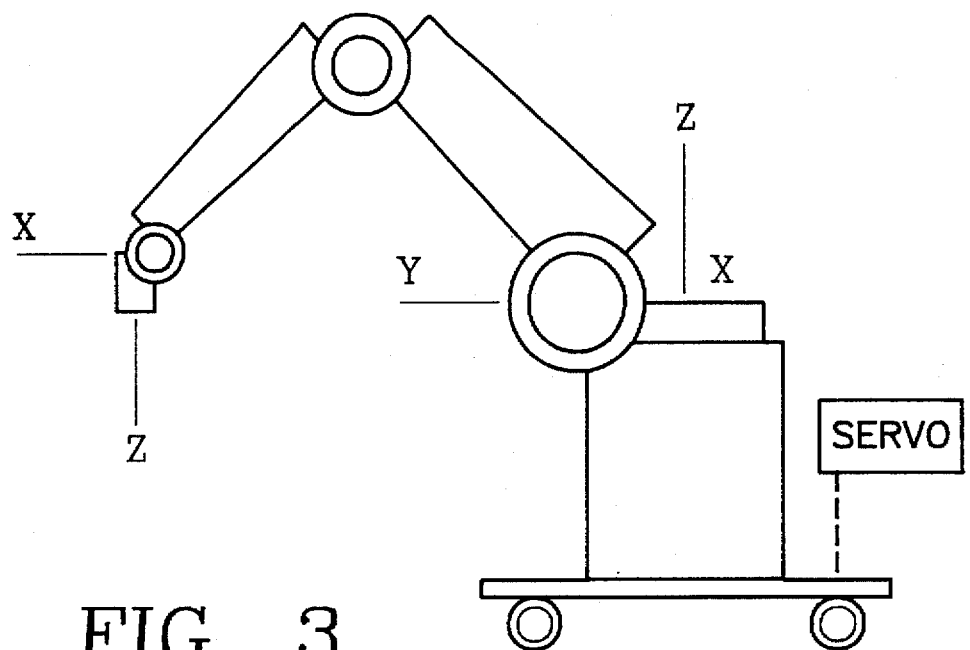
FIG. 3 is a diagram of the robot arm of FIG. 1 in one position of interest.

The Silicon Graphics IRIS 4D70-GT is a Workstation with both high-speed computing and graphics capabilities, and is used in this simulation study. A three-dimensional color rendering of the Robotics Research K1207 arm is built with a set of primitives that use the IRIS "C" language graphics library. When the program is run, it initially displays the arm and its state information on the IRIS screen as shown in FIG. 3. The rendering of the arm is centered on the screen with the joint angles, Cartesian hand coordinates, arm angle, manipulability indices, and trajectory time information displayed in a table in the lower left corner, the redundancy control mode is displayed in the upper left, and the user menu box (not shown) appears as needed in the upper right corner of the screen. Since the zero configuration of this particular arm is a singular configuration, the arm shown in this figure is in the user-defined "home" configuration. Simulation software is written in "C" and animates the kinematic control results as they are computed so as to move the arm continuously on the screen. FIGS. 4(a)–(d) show the evolution of the arm as it moves from an initial to a user-specified final configuration. The control law is computed and used to continuously change the arm configuration and the state information in the lower left corner of the screen is updated at every sampling instant. A simple cycloidal trajectory generator provides point-to-point straight-line Cartesian paths based on Cartesian goal points input by the user either from the keyboard or from the mouse. Alternatively, the user may use the mouse in teleoperation mode to directly control the arm in joint or Cartesian space, activating different degrees-of-freedom with the mouse buttons. Using a simple stacking feature, the user may save a sequence of intermediate points to a file for a later run. The user can also select from a number of redundancy resolution schemes for each task, adjust optimization parameters or obstacle location, plot the results of each run, or save the data for later analysis. The user may also rerun the simulation program, adjusting his viewing location and perspective on each run.

This interactive graphics simulation environment serves as an essential tool for development and validation of new control schemes for redundant 7 DOF arms. The IRIS also allows the user to simulate the robot workspace graphically and plan the task sequence. It can then be used for "task preview" by simulating the robot control algorithms and animating the task scenario. In this mode of operation, the IRIS can be used for operator training and rehearsal, prior to actual task execution. This preview mode is important in dealing with redundant arms, since it enables the user to explore various alternatives for redundancy resolution and can reveal unexpected behavior of the robot.

Several configuration control schemes for the 7 DOF Robotics Research arm have been designed and verified by simulation on the IRIS. The case studies presented here are samples selected from an extensive computer simulation study which was carried out to test the performance of the proposed control schemes. These cases are chosen for presentation because they illustrate the flexibility and versatility of the configuration control approach to redundant manipulators. Three case studies are presented in this section, namely: elbow control, collision avoidance, and optimal joint movement.

3.1 Elbow Control

Figure 5:
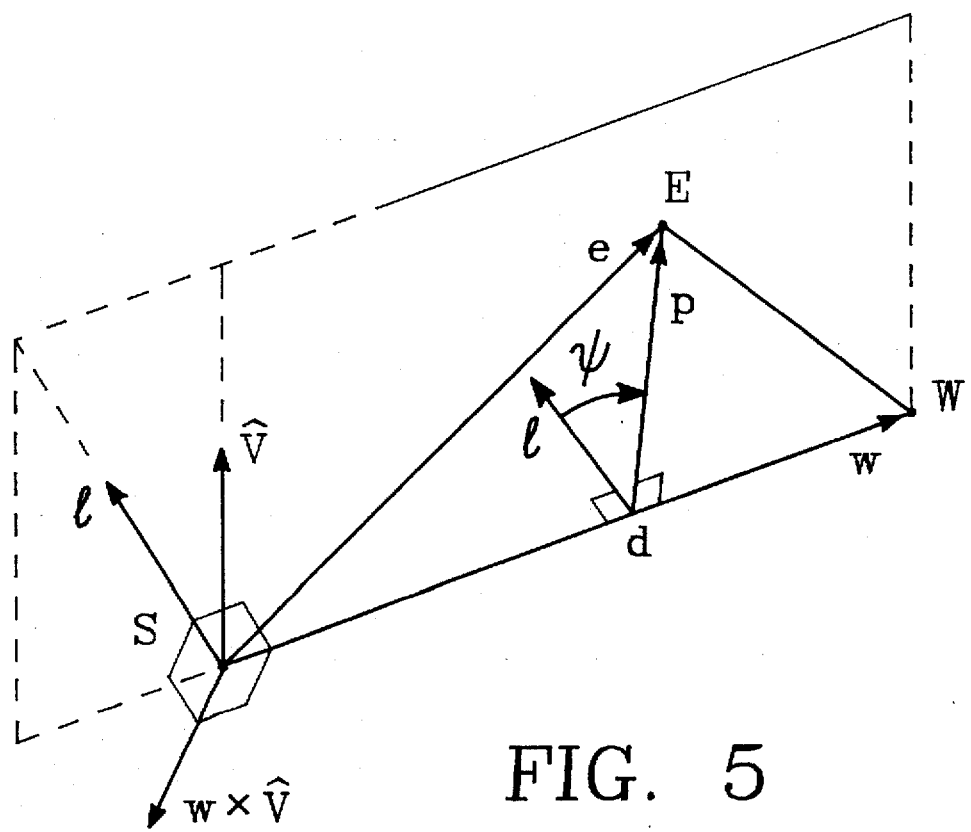
FIG. 5 is a diagram illustrating the coordinates employed in the detailed description of the invention below.

The presence of a redundant joint in the 7 DOF Robotics Research arm results in infinite distinct arm configurations with the same/hand position and orientation. This leads to a physical phenomenon known as "self-motion" or "orbiting," which is a continuous movement of the joints that leaves the hand motionless. The self-motion of the RR arm corresponds to the elbow point E traversing a circle around the line SW joining the shoulder S to the hand W, without moving the hand frame. Thus the elbow position, together with the hand coordinates, forms a complete representation of the geometrical posture (i.e., the physical shape) of the whole arm in the entire workspace. One natural representation of the elbow position is the "arm angle" $\psi$ defined as the angle between the arm plane SEW and a reference plane, such as the vertical plane passing through the line SW, [15], as depicted in FIG. 5. The angle $\psi$ succinctly characterizes the self-motion of the arm and uniquely specifies the elbow position for a given hand frame. Other viable representations of the elbow position are the x, y, or z Cartesian coordinates of the elbow (i.e., $E_x$, $E_y$, or $E_z$) in the base frame. The choice of $\psi$ or a particular elbow coordinate is clearly dictated by the task that the arm is required to perform. In a recent paper [15], simple and computationally efficient methods of computing the arm angle $\psi$ and the associated constraint Jacobian $J_\psi$ are given, where $\psi = J_\psi \dot\theta$. Following, $\psi$ and $J_\psi$ are computed from $$\psi = A\tan2[\hat\omega^T(\hat V \times p), \hat V^T p] \quad (14)$$

$$J_\psi = \frac{(\hat\omega \times p)^T}{\|p\|^2} E +$$

$$\left\{ \frac{\hat V^T \omega}{\|H\|^2}(\hat\omega \times j)^T - \frac{\hat\omega^T e}{\|\omega\| \cdot \|p\|^2}(\hat\omega \times p)^T \right\} W \quad (15)$$

where E and W are the Jacobian matrices related to the elbow and the wrist linear velocities and other symbols are defined in FIG. 5, with 'caret' designating a unit vector.

The user interacts with the IRIS Workstation by using the keyboard to enter the desired target position and orientation of the hand $(x_f, y_f, z_f, \rho_f, \beta_f, \gamma_f)$ and the desired final arm angle $\psi_f$, as well as the duration of motion $\tau$ and the sampling period $\Delta t$. The hand frame can alternatively be input using the mouse which essentially emulates a 6 DOF cursor. The trajectory generator software then computes smooth cycloidal trajectories for these seven variables to change them from their initial values $(x_0, y_0, z_0, \rho_0, \beta_0, \gamma_0, \psi_0)$ to the final values in the specified time duration. For instance, a typical cycloidal trajectory for the desired arm angle $\psi_d$ is $$\psi_d(t) = \begin{cases} \psi_0 + \frac{\psi_f - \psi_0}{2\pi}\left[\frac{2\pi t}{\tau} - \sin\frac{2\pi t}{\tau}\right] & 0 \leq t \leq \tau \\ \psi_f & \tau \leq t \end{cases} \quad (16)$$

Note that only the ratio of elapsed time to motion time $t/\tau$ is needed for the trajectory generator. In discrete-time implementation, the number of samples during motion is equal to $$\frac{\tau}{\Delta t}.$$

Note that, using the cycloidal functions, the hand moves on a straight-line path; since we obtain $$\frac{x - x_0}{x_f - x_0} = \frac{y - y_0}{y_f - y_0} = \frac{z - z_0}{z_f - z_0}$$

Figure 6:
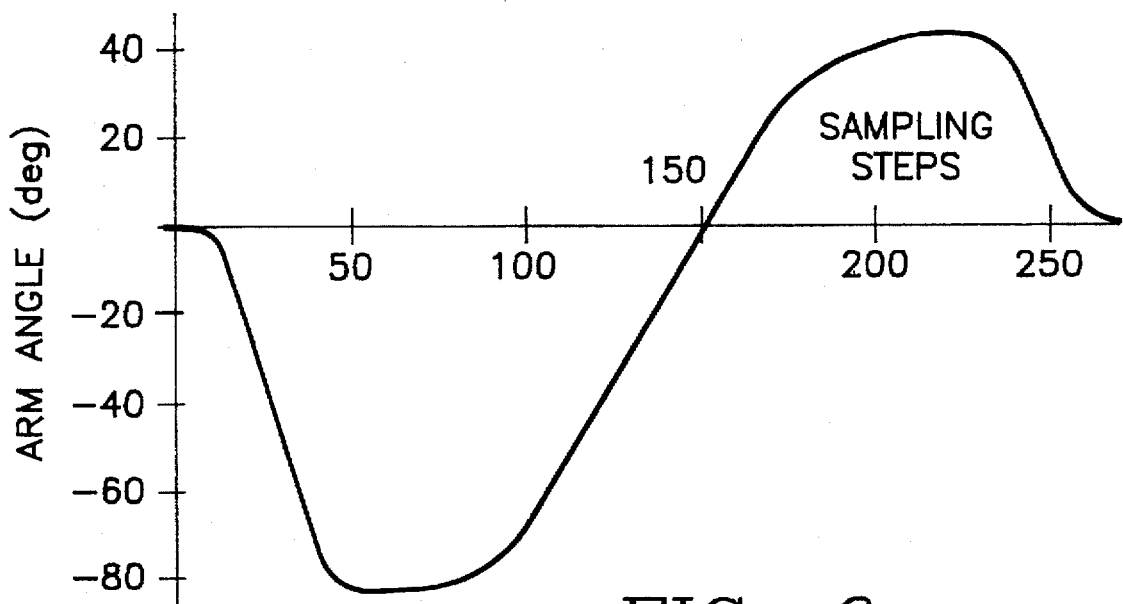
FIG. 6 is a graph illustrating the arm angle as a function of the number of sampling steps in one implementation of the invention.
Figure 12G:
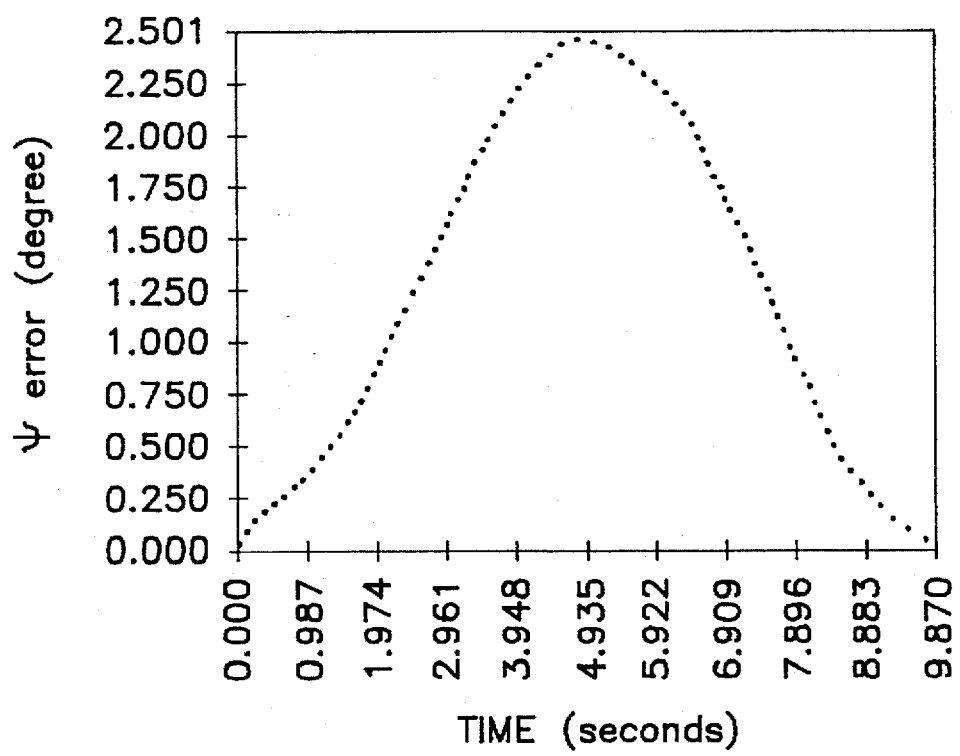
FIGS. 12a through 12g are graphs illustrating errors in respective parameters of joint position and joint angle as a function of time in an implementation of the invention.
Figure 7A:
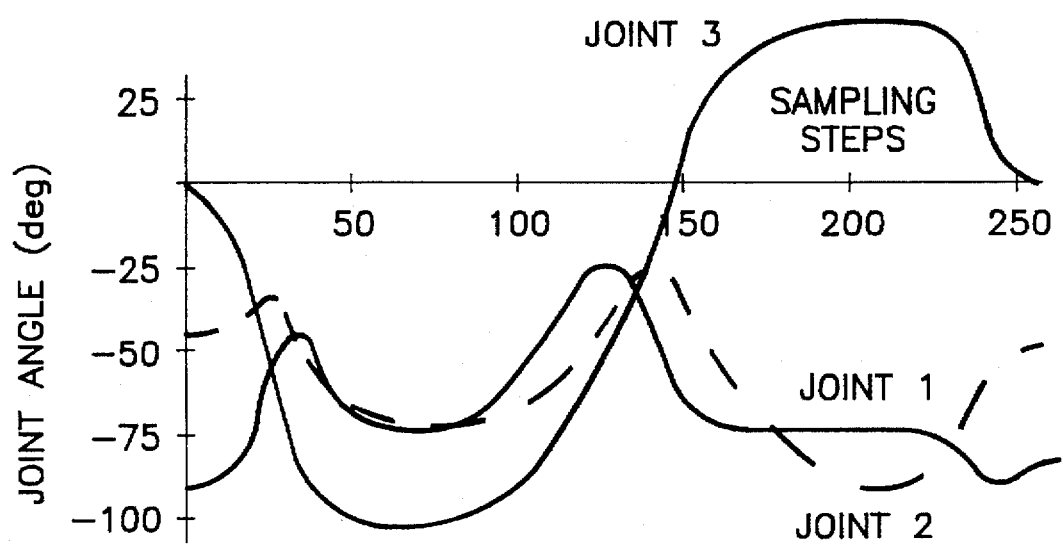
FIGS. 7a and 7b are graphs illustrating joint angles of respective joints of the arm of FIG. 1 as a function of the number of sampling steps in an implementation of the invention.
Figure 7B:
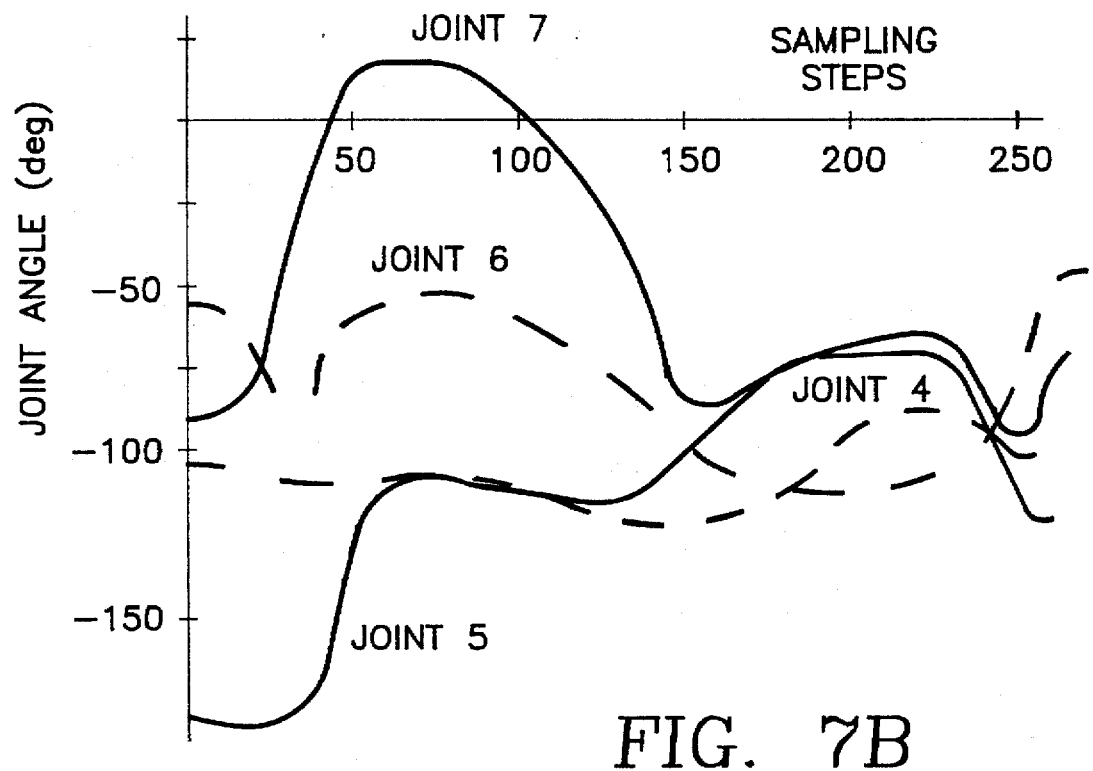

In this simulation study, the Robotics Research arm is initially at the joint configuration $\theta(0) = [-90°, -43.3°, 0°, -101°, -180°, -54.3°, -90°]^T$ This yields the initial end configuration $P_o = \{x=0, y=90, z=0, \rho=-90°, \beta=0°, \gamma=0°\}$ relative to the base frame and the initial arm angle $\psi_0 = 0°$, where the position coordinates are in centimeters and the angles are in degrees. The hand is commanded to trace a triangle by making the successive moves: $P_0 \to^{\tau_1} P_1$, $P_1 \to^{\tau_2} P_2$, $P_2 \to^{\tau_3} P_0$, where $P_1 = \{50, 50, 50, 0°, 0°, 0°\}$, $\psi_4 = -90°$, $\tau_1 = 2.0$ $P_2 = \{-50, 50, 50, 0°, 0°, 0°\}$, $\psi_2 = +45°$, $\tau_2 = 4.0$, $\tau_3 = 1.0$ while $\Delta = 0.025$ in all cases and the unit of time is the second. The kinematic configuration control scheme is used to compute the required joint motions that result in the commanded hand and arm angle trajectories. Note that $J_\psi$ from (15) is used in (10), and we set $W_e = I_6$, $W_c = 1$ and $W_v = 0$ since no arm singularities are encountered during the motion. FIG. 6 shows the executed motion of the elbow, in which the arm angle changes from 0° to −90° and then to +45° during the hand motion. The variations of the joint angles $\theta_1, \ldots, \theta_7$ to achieve the commanded arm motion are shown in FIGS. 7a–7b. These figures illustrate that all the seven joint angles return to their initial values at completion of the task. Thus, the initial and final arm configurations are identical and the robot has executed a cyclic (i.e., conservative) motion under configuration control.

3.2 Collision Avoidance

One of the advantages of the 7 DOF arm is the potential to use the "extra" DOF to maneuver in a congested workspace and avoid collision with obstacles by configuring the arm appropriately without perturbing the hand trajectory. In this formulation, all workspace obstacles are enclosed in convex volumes and each volume defines a "space of influence" (SOI) for the control law. In this study, the SOIs are assumed to be spheres in the three-dimensional workspace, but extension to other geometrical shapes is possible using distance functions [21]. In the configuration control framework, the collision avoidance requirement is formulated as a kinematic equality/constraint $$\phi(\theta) \stackrel{\Delta}{=} d_c(\theta) - r_0 \geq 0 \qquad (17)$$

where $d_c(\theta) = \|X_c(\theta) - X_0\|$ is the critical distance between the arm and the obstacle, $X_0$ is the position of the SOI center, $r_0$ is the radius of the SOI, and $X_c$ is the position of the "critical point" on the arm currently at minimum distance from the obstacle. Note that the location of the critical point $X_c$ and the critical distance $d_c$ are both configuration dependent and are continuously recomputed as described [16]. Two modes of operation are possible:

Case One $d_c(\theta) \geq r_0$: In this case, the equality constraint (17) is satisfied and the entire arm is outside the obstacle SOI. Therefore, the constraint is active/ and the manipulator redundancy can be used to achieve other additional tasks, such as those in Sections 3.1 and 3.3.

Case Two $d_c(\theta) < r_0$: In this case, the equality constraint (17) is active/ and the arm is inside the obstacle SOI. Thus, the redundancy is utilized to avoid collision with the obstacle by inhibiting the motion of the critical point on the arm in the direction toward the obstacle. To this end, (17) is replaced by the equality constraint $d_c(\theta) = r_0$, and the constraint Jacobian is obtained as $$J_c(\theta) = \frac{\partial \phi(\theta)}{\partial \theta} = \frac{\partial d_c(\theta)}{\partial \theta}.$$

The configuration control scheme can now be employed to achieve the desired hand motion as well as collision avoidance. However, in this formulation, the additional task constraint is either "on" or "off." This can lead to an undesirable rapid switching between the "on" and "off" conditions thus resulting a "chattering" phenomenon on the SOI boundary. Furthermore, switching between the collision avoidance task in Case Two and another additional task (such as elbow control) in Case One can cause discontinuity problems. The variable task weighting scheme alleviates both the chattering and discontinuity problems. In this scheme, the weighting factors $w_{el}$ and $w_{co}$ for the elbow control and collision avoidance tasks Cases One and Two are chosen as functions of the critical distance $d_c(\theta)$, instead of predefined constants. The use of variable weighting factors for the additional tasks allows the collision avoidance constraint to be incorporated gradually with the basic task, and furthermore circumvents the discontinuity problem in switching between different additional tasks.

Figure 8A:
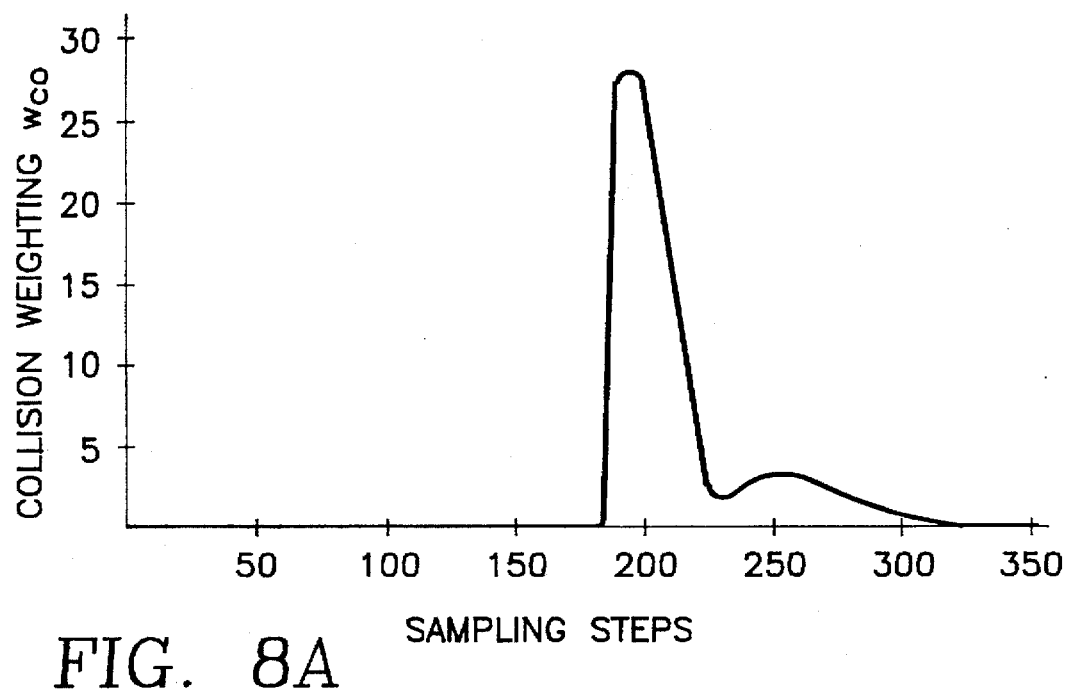
FIGS. 8a and 8b are graphs illustrating a collision weighting factor and a collision avoidance critical distance, respectively, as a function of the number of sampling steps in an implementation of the invention.
Figure 8B:
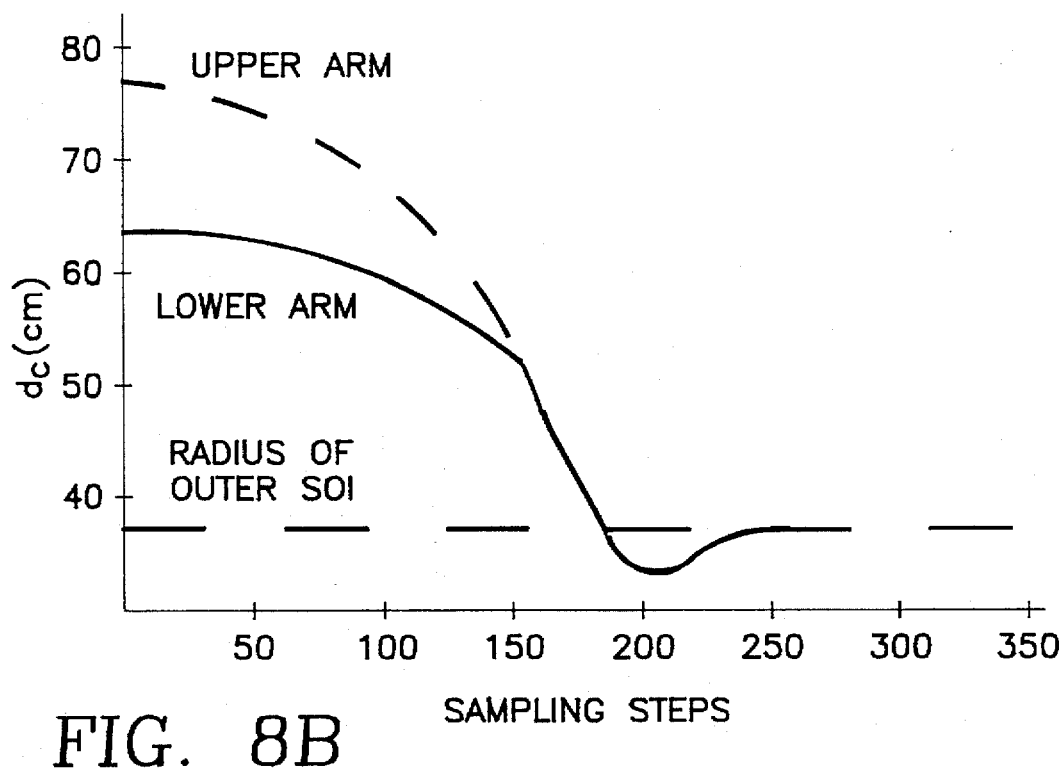
Figure 9:
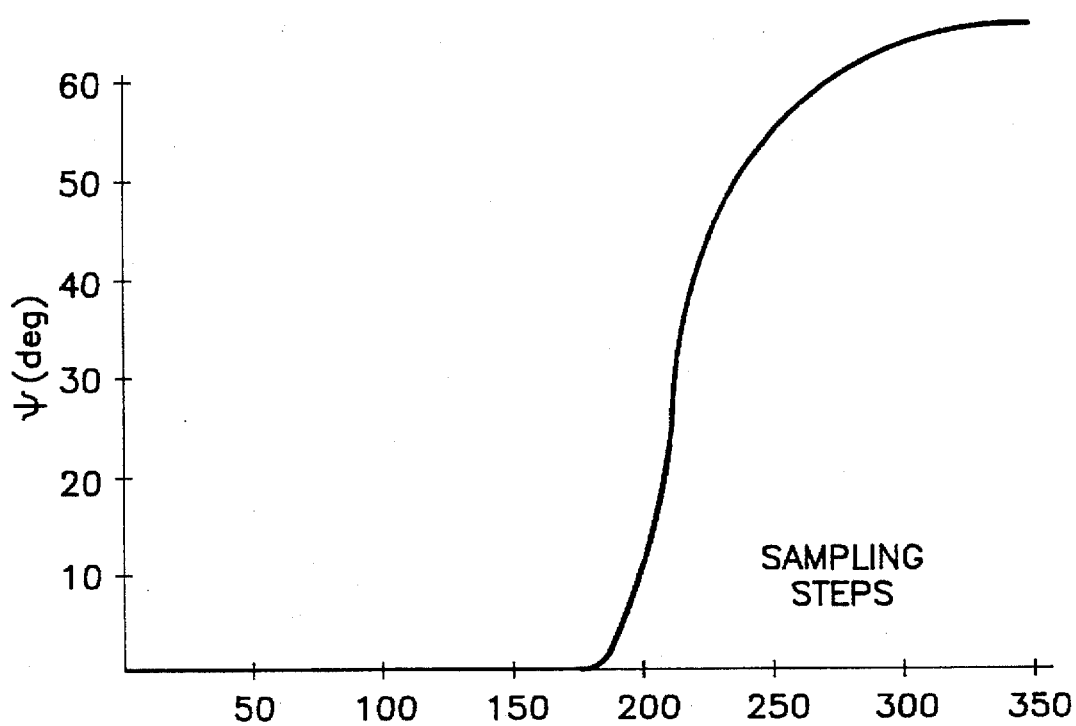
FIG. 9 is a graph illustrating the variation of the arm angle as a function of the number of sampling steps in an implementation of the invention.

In the simulation study, the Robotics Research arm is initially at the joint configuration $\theta(0) = [-90°, -44.7°, 0°, -89.4°, 0°, -135.8°, 90°]^T$. The task is to move the hand on a straight-line from the initial location $P_0 = [0, 90,0, 0°, 0°, 90°]$ to the target location $P_1 = [-90, 30, -30, 0°, 0°, 90°]$ $\tau = 8.75$ seconds with $\Delta t = 0.025$ such that during motion the arm avoids collision with a workspace obstacle. The obstacle is enclosed by two SOIs: an inner SOI which touches the actual obstacle boundary, and an outer SOI which allows for some "buffer." The inner and outer SOIs are concentric spheres with centers at $z_0 = 13.3$] and radii $r_i = 8.5$ cm and $r_0 = 37.5$ cm. Each hand coordinate is required to track a cycloidal trajectory as described in Section 3.1. Initially, before the obstacle is encountered, it is required to keep the arm angle constant at its initial value of $\psi = 0°$ to resolve the redundancy. When the obstacle is encountered, the redundancy is used for collision avoidance at the expense of loss of elbow control. After the obstacle encounter, the arm angle should remain constant. In this simulation, when the arm is outside the outer SOI (Case One), we set $w_{el} = 1$ and $w_{co} = 0$ to achieve elbow control. As soon as potential collision is detected (Case Two), the redundancy resolution goal switches smoothly to collision avoidance by setting $w_{el} = 0$ and increasing $w_{co}$ as an inverse square function of $d_c(\theta)$, that is $$w_{co} = \frac{10}{(d_c - r_i)^2} - \frac{10}{(r_o - r_i)^2} \qquad (18)$$

for $d_c < r_o$. Using (18), when the arm is at the outer SOI boundary ($d_c = r_o$), we have $w_{co} = 0$; and as the arm moves closer to the obstacle, $w_{co}$ creases rapidly so that $w_{co} \to \infty$ as $d_c \to r_i$. The variations of $w_{co}$ and the critical distance $d_c(\theta)$ are shown in FIGS. 8a–8b. It is seen that the increase in $w_{co}$ has hindered motion of the arm inside the inner SOI, thus ensuring that collision avoidance is successfully accomplished throughout the arm motion. The variation of the arm angle $\psi(\theta)$ is shown in FIG. 9, and illustrates that the arm angle is held constant when the obstacle is not encountered, as expected.

3.3 Optimal Joint Movement

In this case study, the redundancy resolution goal is to distribute the hand motion among the joints in such a way that a weighted sum of joint movements is kept at minimum. Toward this end, the optimization objective function is selected as $$G(\theta) = \sum_{i=1}^{7} 0.5 k_i [\theta_i(t) - \theta_i(0)]^2 \qquad (19)$$

where $k_i$ is the weighting factor for joint i movement and $[\theta_i(t) - \theta_i(0)]^2$ denotes the current deviation of joint angle $\theta_i(t)$ from its initial position $\theta_i(0)$. The objective function $G(\theta)$ (19) represents the total instantaneous potential energy stored in seven hypothetical springs attached to the robot joints with stiffness coefficients $\{k_i\}$ an natural lengths $\{\theta_i(0)\}$. By choosing appropriate numerical values for $\{k_i\}$, the user can resolve the hand motion among the joints such that the joints with larger k move less at the expense of those with smaller k. The ability to penalize individual joint movement may also lead to a desirable distribution of joint torques for a given hand trajectory [17]. The condition for optimality of $G(\theta)$ subject to the end-effector constraint $Y = Y(\theta)$ has been found [17] to be $$N_e(\theta) \frac{\partial G(\theta)}{\partial \theta} = 0,$$

where $N_e$ is a 1×7 vector which lies in the null-space of the hand Jacobian $J_e$, that is $J_e N_e^T = 0$. This implies that for optimality, the projection of the gradient of the objective function onto the null-space of the hand Jacobian must be zero. To achieve optimal joint movement, the kinematic function is defined as $$\phi(\theta) = N_e(\theta) \frac{\partial G(\theta)}{\partial \theta}$$

and its desired value is set to $\phi_d(t) = 0$, to represent the optimality condition. The configuration control approach can then be applied to obtain the joint trajectories which cause the hand to attain the commanded motion with an optimal total joint spring energy.

Figure 10:
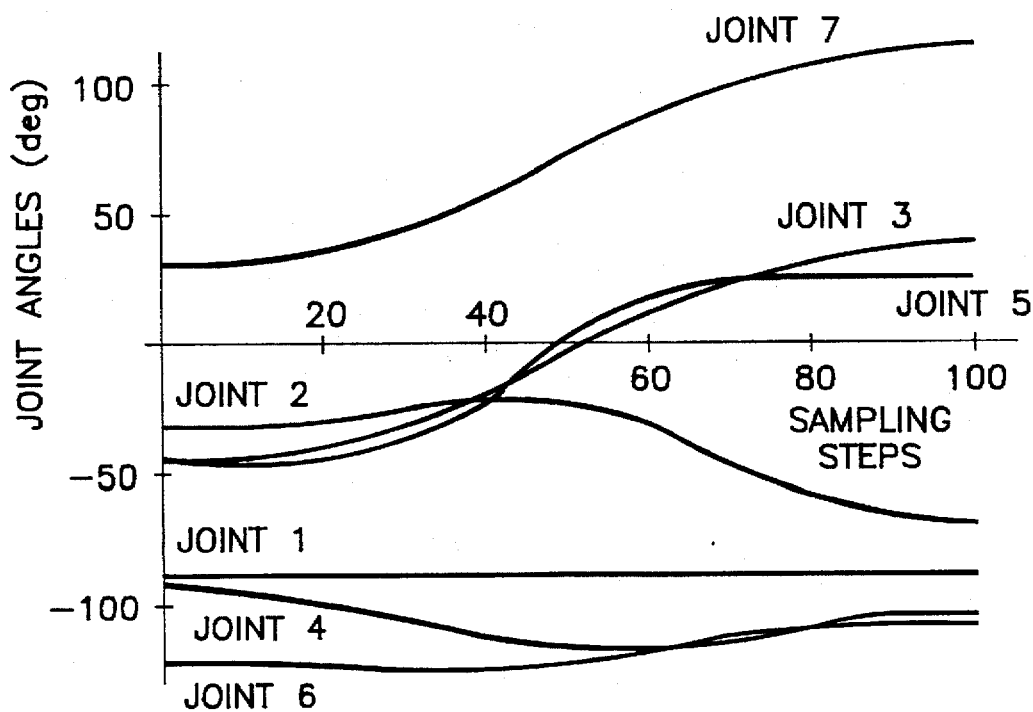
FIG. 10 is a graph illustrating various joint angles as a function of the number of sampling steps in an implementation of the invention.

In this simulation study, the arm is initially at $\theta(0) = [-89.1°, -32.1°, -45°, -91.5°, -47°, -126.6°, 29.7°]^T$ giving the initial hand coordinates as $P_0 = [50, 70, 30, 0°, 0°, 90°]$. The hand is commanded to move on a straight-line to the target location $P_1=[-50, 70, -30, 90°, 0°, 0°]$ $\tau=2.5$ seconds with $\Delta t=0.025$, while the arm redundancy is used to achieve the hand trajectory with optimal joint movement. The user types in the stiffness coefficients of the joint springs $\{k_i\}= \{20,1,1,1,1,1,1\}$, where a large value for $k_1$ dictates the heavy penalty on joint 1 movement. The program then computes $$\phi(\theta) = N_e \frac{\partial G}{\partial \theta} \text{ and } J_c = \frac{\partial \phi}{\partial \theta}$$

and augments the hand Jacobian $J_e$ to obtain $J$. The required joint trajectories are then found by using (10) with $W_e=I_6$, $W_c=1$, $W_v=0$. The variations of the joint angles are given in FIG. 10, which shows that the first joint with a large weighting factor has moved considerably less than the other joints, as desired.

3.4 Alternative Redundancy Resolution Goals

In addition to the redundancy resolution goals discussed in Section 3.1–3.3, the user can select other criteria from a menu presented to him on the IRIS screen. This menu of redundancy resolution options is an area of current research, and analytical techniques that are being developed are added to the menu for test and validation. In this section, we shall present some of the items on the redundancy resolution menu.

(i) Joint Locking: The user can select a particular joint, say $\theta_j$, to be locked during the commanded hand motion. In this case, the relationship $\theta_j(t)=\theta_j(0)$ is treated as the additional task, with $J_c=[0, \ldots, 1, \ldots 0]$. The configuration control approach then attempts to move the hand using the remaining six joints while keeping $\theta_j$ constant. This is equivalent to deleting the $j$ th column of $J_e$ to obtain the 6×6 matrix $\tilde{J}_e$ and then solving $Y = \dot{e}, \text{dot}\dot{J} + \text{ee}_e + \text{e,acu } \theta + \text{ee}$ for the remaining six joints $+\dot{e},\text{acu } \theta+\text{ee}$. The acquired solution for $+\dot{e},\text{acu } \theta+\text{ee}$ depends on the locked value of $\theta_j$, namely $\theta_j(0)$. Note that for some selections of $\theta_j$, the resulting Jacobian $\tilde{J}_e$ is always singular, which implies that from a physical point of view, the hand position and orientation can not be changed arbitrarily while $\theta_j$ is locked. The joint locking option is useful in investigating the fail-tolerance feature of the robot joints, i.e., preservation of hand motion despite a joint failure. In addition, this option can be exercised when the operation only wishes to perform the basic task of hand placement and orientation.

(ii) Joint Limit Avoidance: The joints of any robot have rotational limitations that can typically be expressed as $\alpha_j \geq \theta_j \geq \beta_j$, where $\alpha_j$ and $\beta_j$ are the lower and upper joint limits. One of the applications of redundancy is to resolve the hand motion among the joints such that their limits are not violated. The joint limit equality constraint is treated within the configuration control framework in a similar manner to the obstacle avoidance constraint in Section 5.2. The user can select the joint limits and command hand motion, and examine the robot performance. Since inequality constraints are treated as equality conditions for redundancy resolution, for some joint angles the augmented Jacobian can be singular and the problem may not have a solution.

(iii) Manipulability Maximization: A common objective function to be maximized by the utilization of redundancy is the hand manipulability index [15] defined as $\mu(\theta)=\sqrt{\det}$. This scalar index vanishes at the hand singular configurations where $J_e(\theta)$ is rank-deficient. Therefore, maximizing $\mu(\theta)$ during a prescribed hand motion leads to arm configurations which avoid the hand Jacobian singularities as much as possible. This solution can be obtained by following Section 5.3 with $G(\theta)$ replaced by $\mu(\theta)$. Note that in this case $$\frac{\partial \mu}{\partial \theta}$$

must be computed numerically.

4. Real-Time Control of the 7 DOF Arm

In this section, we describe the implementation and experimental validation of the configuration control scheme on the 7 DOF Robotics Research arm. The laboratory setup is described first, followed by a description of a simple experiment. In this experiment, the configuration control approach is implemented for real-time control of the Robotics Research arm, with elbow positioning for redundancy resolution.

The Robotics Research Laboratory at JPL consists of one Model K1207 7 DOF arm and control unit from the Robotics Research Corporation, a VME-based chassis with MC 68020 processor boards, two 3 DOF industrial rate joysticks, a motorized lathe-bed, and a Silicon Graphics IRIS Workstation. The arm pedestal is mounted on a mobile platform of the lathe-bed which provides one additional degree-of-freedom. The arm control unit has an electronic servo-level interface, which allows the user to communicate directly with the joint servomotors at a sampling frequency of $f_s=400$ Hz, i.e., a sampling period of $T_s=2.5$ ms. The joint servomotors can be commanded in any of the four modes: position, velocity, torque, and current. This makes it possible to operate the arm under either kinematic or dynamic control schemes, and therefore provides a testbed for validation of different 7 DOF control laws. In the present implementation, all seven joints are commanded in the position mode.

Figure 11:
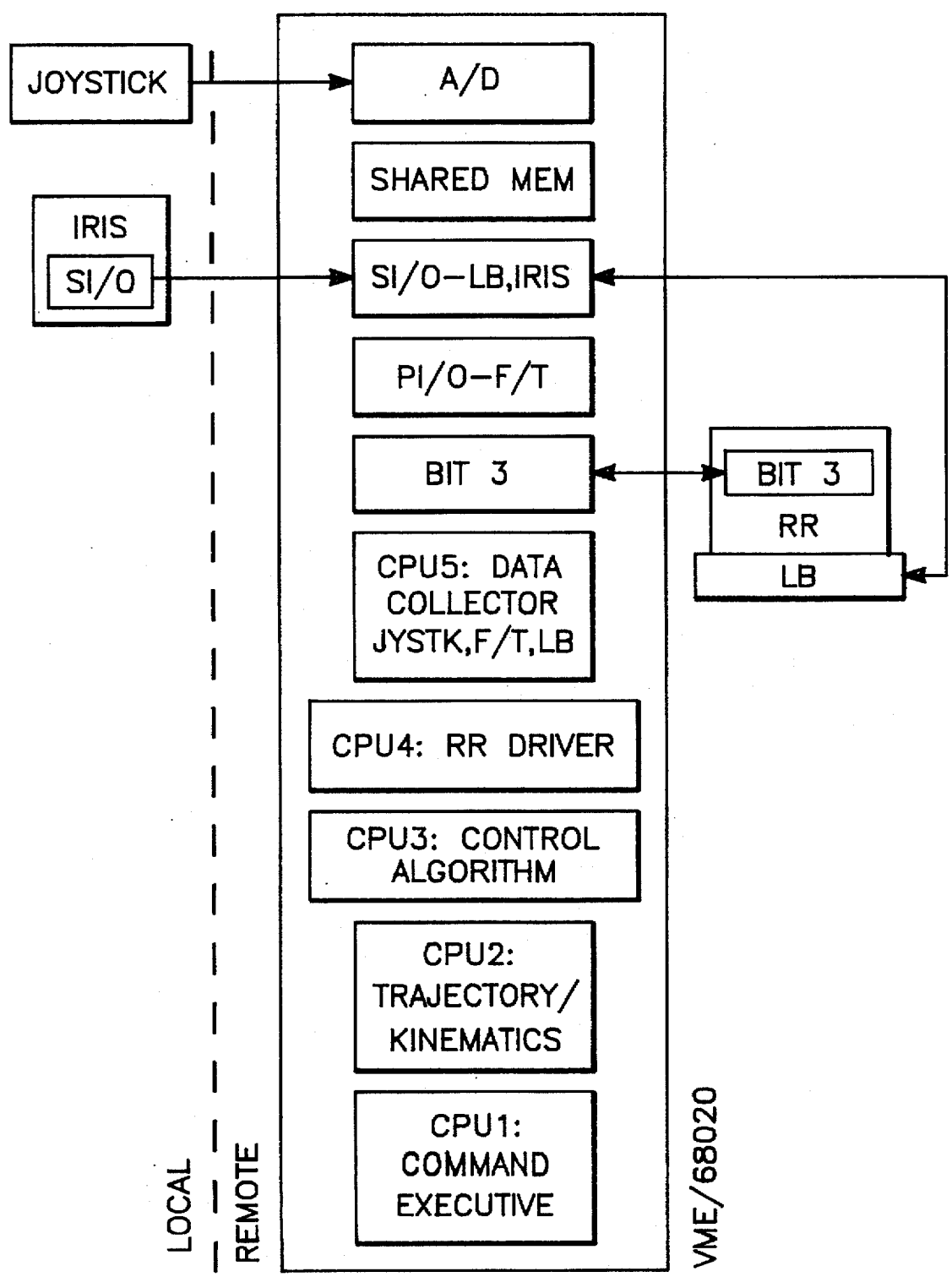
FIG. 11 is a block diagram of a hardware system employed in carrying out one embodiment of the present invention.
Figure 12A:
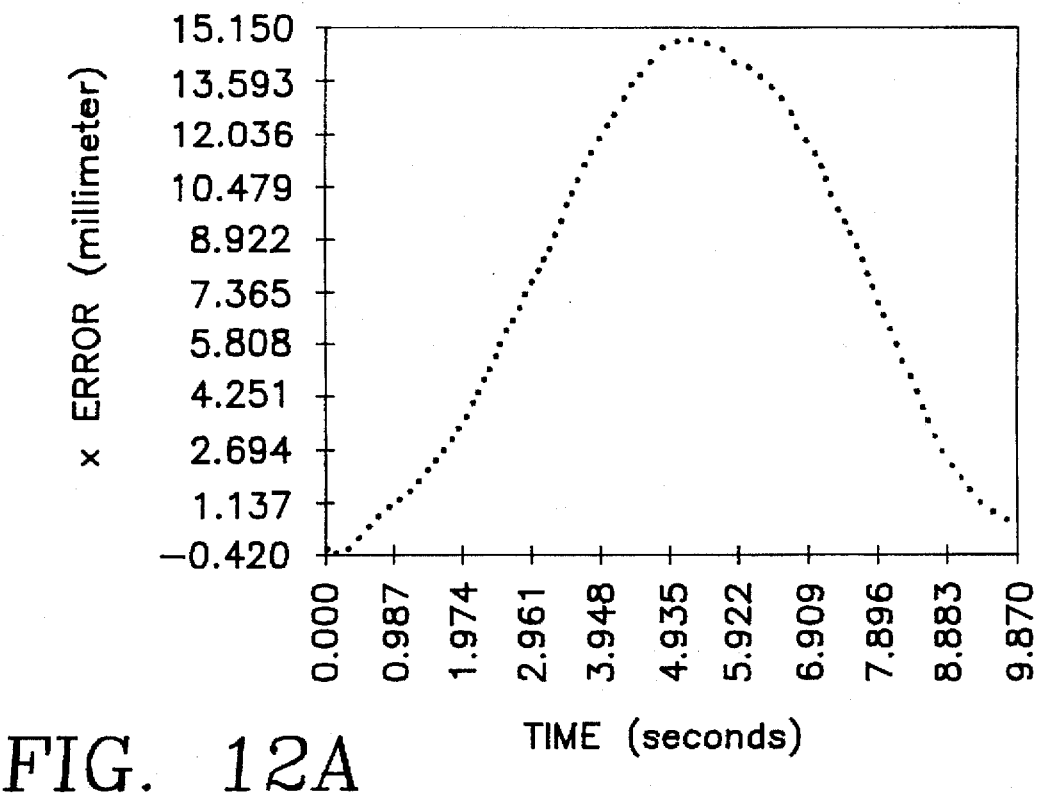
Figure 12B:
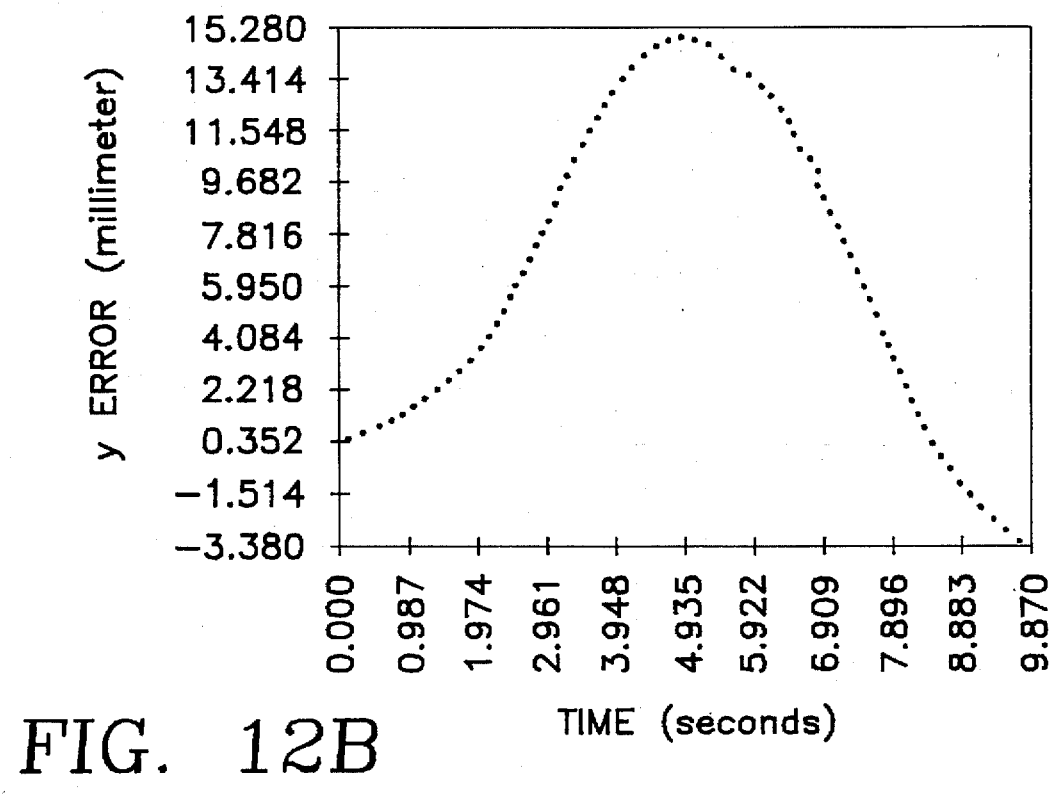
Figure 12C:
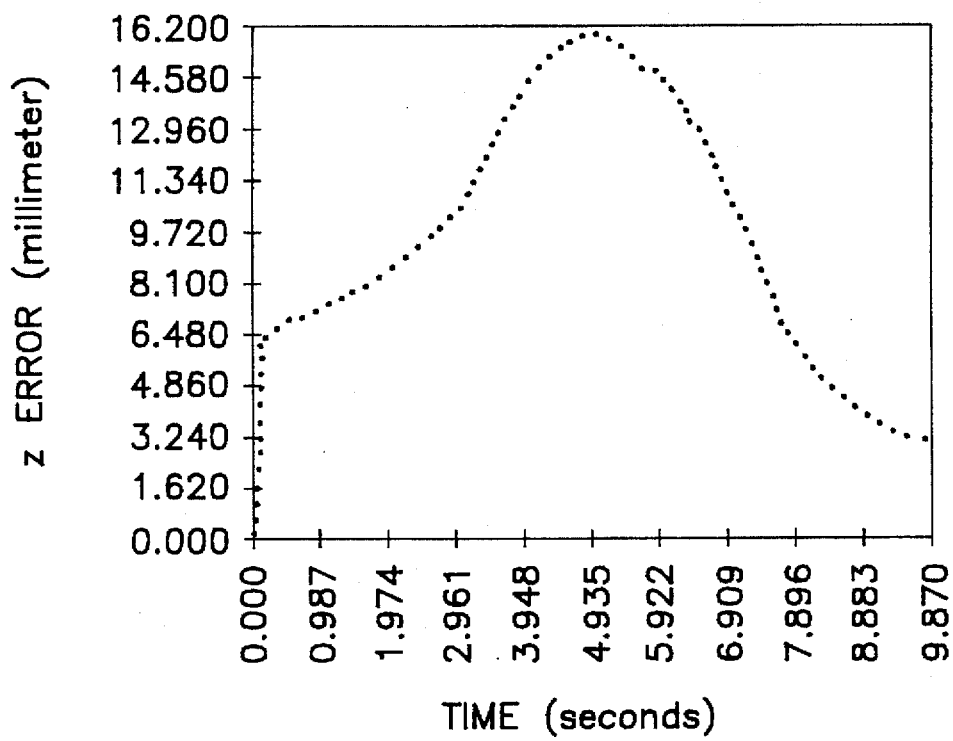
Figure 12D:
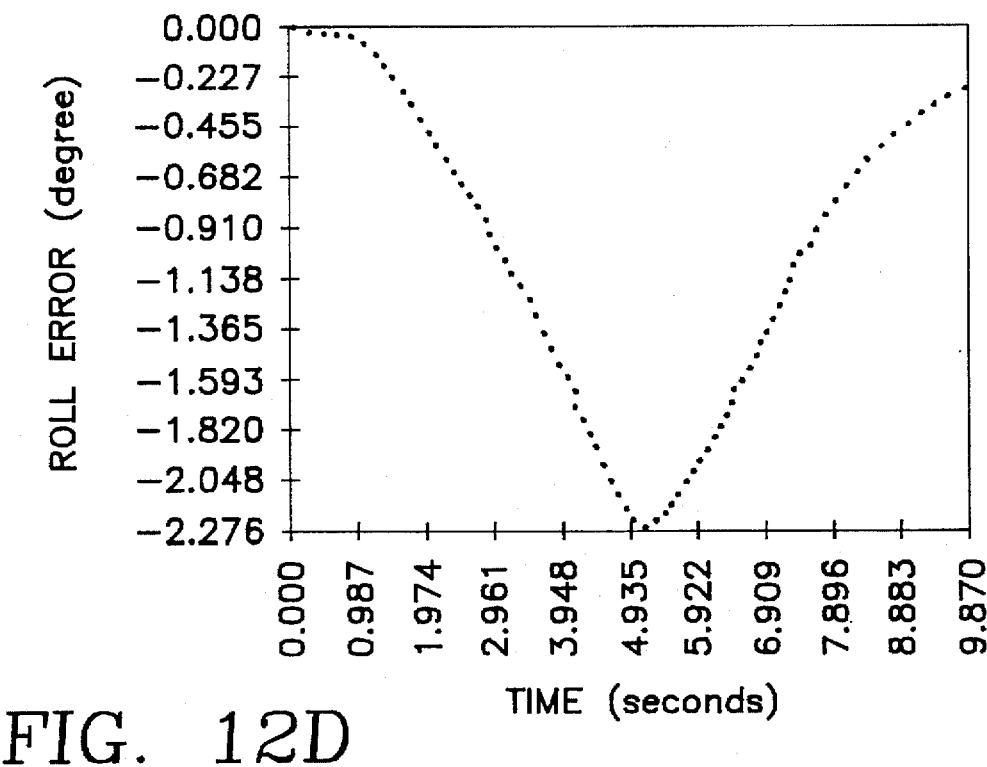
Figure 12E:
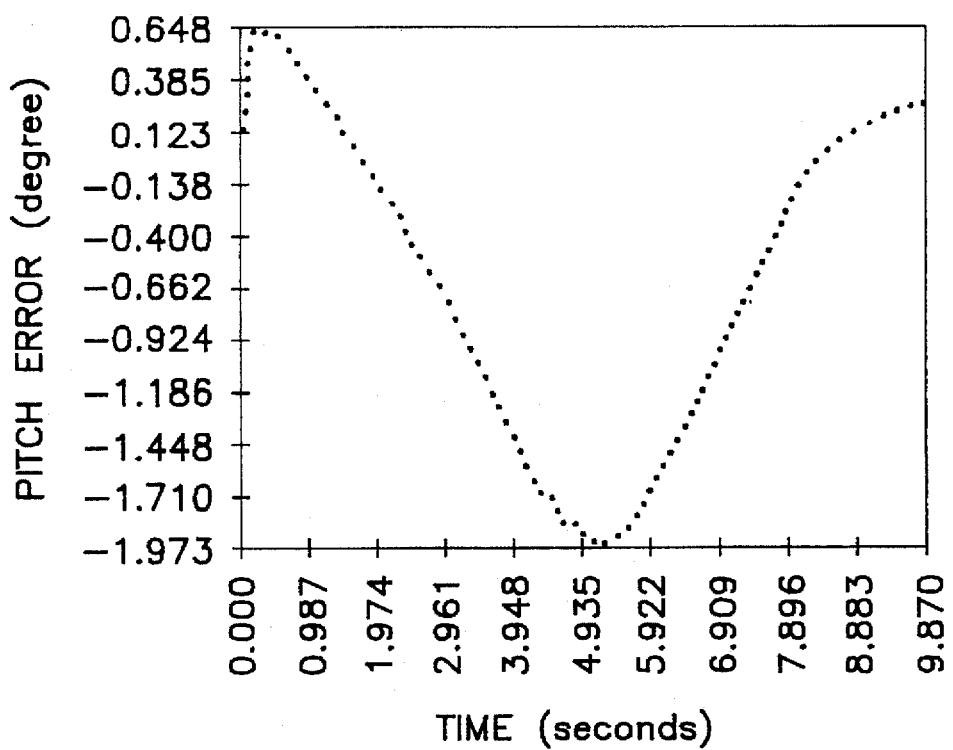
Figure 12F:
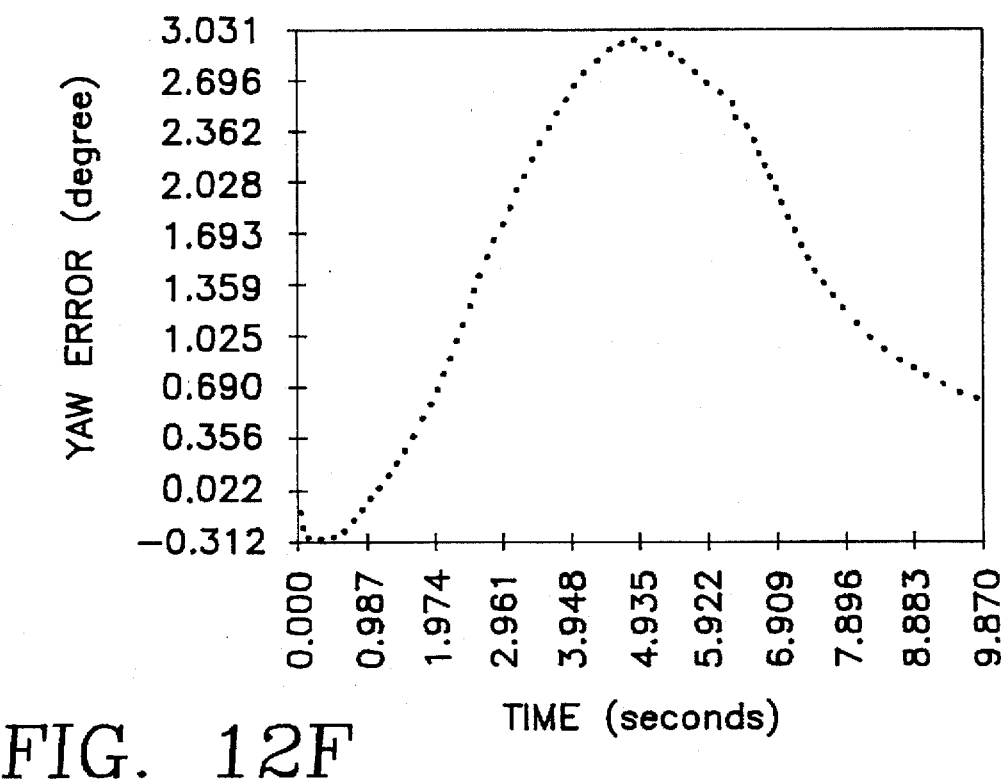

The hardware diagram of the experimental setup is shown in FIG. 11. The IRIS can operate in two different modes. First, it creates an interactive graphics simulation environment for analysis and control of the 7 DOF arm, as discussed in Section 3. Second, the IRIS serves as the graphical user interface through which the operator interacts with the actual arm in real-time and issues motion commands in joint or task space. Using this dual-mode functionality, the IRIS can be used initially in "preview mode" for animating the task scenario, and subsequently in "execution mode" to command the arm to duplicate the simulated motion. The software which provides graphical user interface and simulation capabilities resides on the IRIS.

The VME-based real-time robot control system receives commands from the IRIS to move the actual arm. This is the part of the system which handles all real-time operations including computation of control laws and transmission of appropriate signals to the multibus-based arm control unit. The control unit dispatches the commands for execution to the seven joint motors of the arm to perform the task. The VME chassis configuration contains five CPU boards that communicate through a shared memory board to perform all the necessary computations to provide real-time manipulator control. The first CPU interfaces with the high-level software residing on the IRIS, receives commands from the operator and obtains acknowledgment and state information from the low level after command execution. This processor also serves as the master by scheduling the synchronous operations of the slave processors that perform the real-time computations. The second CPU performs real-time trajectory generation and kinematic computations. This includes generating the desired end-effector trajectories and computing the necessary kinematic and Jacobian transformations. The second CPU also accesses and updates the world model and performs computations to resolve the manipulator redundancy. The third CPU is designated to perform all the computations associated with invoking various dynamic control algorithms (not used at present). The fourth CPU solely communicates with the arm control unit by executing the arm interface driver at every 2.5 milliseconds. A two-card VME-to-multibus adaptor set from the BIT3 Corporation is employed to provide shared memory servo interface with the arm control unit at high speed. The role of the driver is to perform handshake with the arm control unit and to convert data into appropriate format for usage. Some of its features include translating data representation in the multibus to VMEbus format and vice versa and safety checking to avoid hitting physical joint limits and collision with the floor. The fifth CPU hosts various drivers that manipulate the shared memory board which contains global memory formation, read in joystick inputs, control the motorized lathe-bed, and interface with other devices such as a force/torque sensor and a gripper. All software executing on the VME environment is written in the "C" language. Code is developed on a SUN 3/60 UNIX computer utilizing SUN's "C" compiler and Wind River's VxWorks/Wind real-time library. The code is then downloaded through Ethernet to the target processor boards for immediate execution.

To perform initial experiments, a computer program is written for trajectory generation, kinematic computations, and arm interface via the driver. At the present time, all of these computations are performed sequentially on one MC68020 processor with a cycle period of 25 milliseconds. First, a simple cycloidal Cartesian-space trajectory is generated based on the operator's input of the desired arm goal configuration. The 7×1 arm configuration vector X includes the 6×1 vector Y of position and orientation coordinates of the hand and the scalar arm angle $\psi$ for redundancy resolution. At each computation cycle, the output from the trajectory generator is the 7×1 vector of Cartesian increments $\Delta X$. The 7×7 augmented Jacobian J is also computed which embodies the redundancy resolution goal, namely $\psi$ control in this case. The Jacobian is then inverted and multiplied by the Cartesian increments to generate the seven joint increments $\Delta\theta = J^{-1}\Delta X$. Finally, the joint setpoints are computed by adding the increments to the current joint angles and are dispatched to the arm interface driver to move the arm under position mode.

In the present implementation, because of the slow sampling rate of 25 milliseconds, the Jacobian matrix J is computed using the desired joint angles instead of the actual joint angles. In addition, the Cartesian increment $\Delta X$ is calculated using the difference between the two consecutive desired Cartesian setpoints, not by subtracting the actual Cartesian values from the desired Cartesian setpoints. To improve performance, we plan to increase the servo rate by splitting the algorithm on two MC68020 processors. The first processor will be designated solely to communicate with the arm at every 2.5 milliseconds (running the driver as CPU 4). The second processor will perform cycloidal trajectory generation and Jacobian computation and version. The first processor will then obtain the joint setpoints at every 25 milliseconds, but will linearly interpolate these points into ten via-points which are then sent one at a time to the arm controller every 2.5 milliseconds.

In the experiment, the Robotics Research arm is initially at the predefined Cartesian "home" ("cstart") position with the end-effector coordinates (x, y, z, roll, pitch, yaw) and arm angle $\psi$ as X(0)=[−900, 297, 316, 0°, 0°, 44°, 60°] measured relative to a fixed reference frame attached to the shoulder, where the lengths are millimeters and the angles are in degrees. This position corresponds to the joint angular values of $\theta(0)$=[−63°, −61°, 78°, −88°, 79°, −85°, 159°] which is away from the arm singular configuration. Data are collected as all seven Cartesian coordinates move simultaneously from the "cstart" position to the user-specified goal position $X(\tau)$=, where the motion duration $\tau$ is chosen as 10 seconds. This corresponds to the hand translational motion of 866 millimeters. Preliminary experimental results which demonstrate trajectory tracking are presented in FIGS. 12a–12g. For each end-effector coordinate (x, y, z, roll, pitch, yaw) and the arm angle $\psi$, the tracking-error is computed by using the difference between the actual trajectory and the desired trajectory. Note that the maximum error occurs in the middle of the trajectory, i.e. at time t=$\tau$/2=5 seconds. This is because for a cycloidal position trajectory, the velocity is at its peak in the middle of the trajectory, which attributes to the maximum occurrence of linearization errors. From FIGS. 12a–g, in each positional coordinate, the maximum tracking-error does not exceed 16 millimeters, and in each orientational coordinate, the maximum error is less than 3 degrees. Therefore, the experimental results demonstrate the efficacy of configuration control for the 7 DOF arm. Note that the tracking performance will be improved considerably when the computations are split on two processors so that the joint setpoints are updated every 2.5 milliseconds.

5. Motion Control of the 7 DOF Arm with 1 DOF Mobile Platform

Figure 13A:
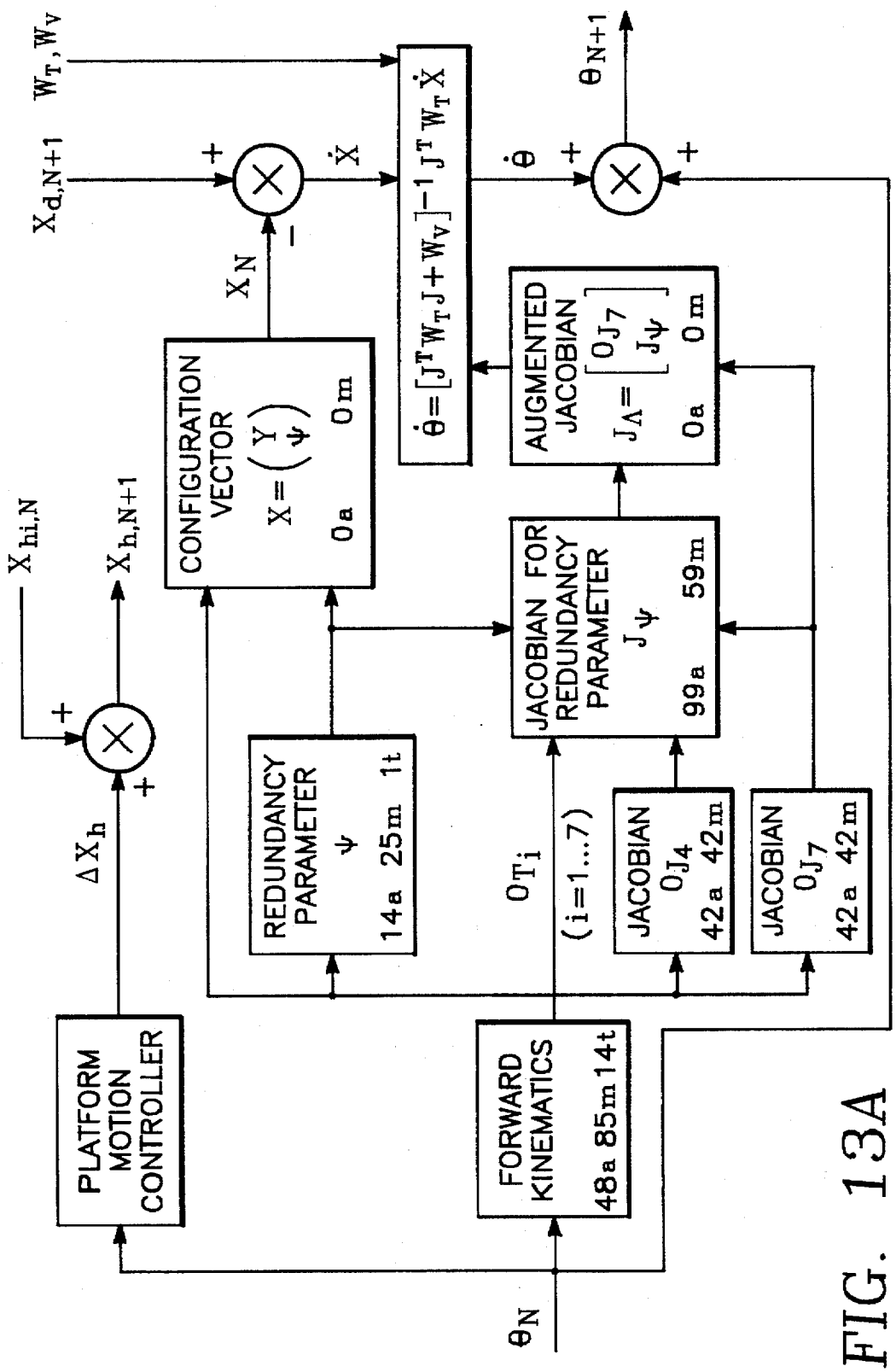
FIG. 13a illustrates the architecture corresponding to Equations (8) and (10) as shown in FIG. 2 additionally including an additional Platform Motion Control routine for position control of the mobile platform.

FIG. 13a illustrates the architecture corresponding to Equations (8) and (10) as shown in FIG. 2 additionally including an additional Platform Motion Control routine for position control of the mobile platform. The Platform Motion Control system will be described in detail in Section 6 below.

Figure 13B:
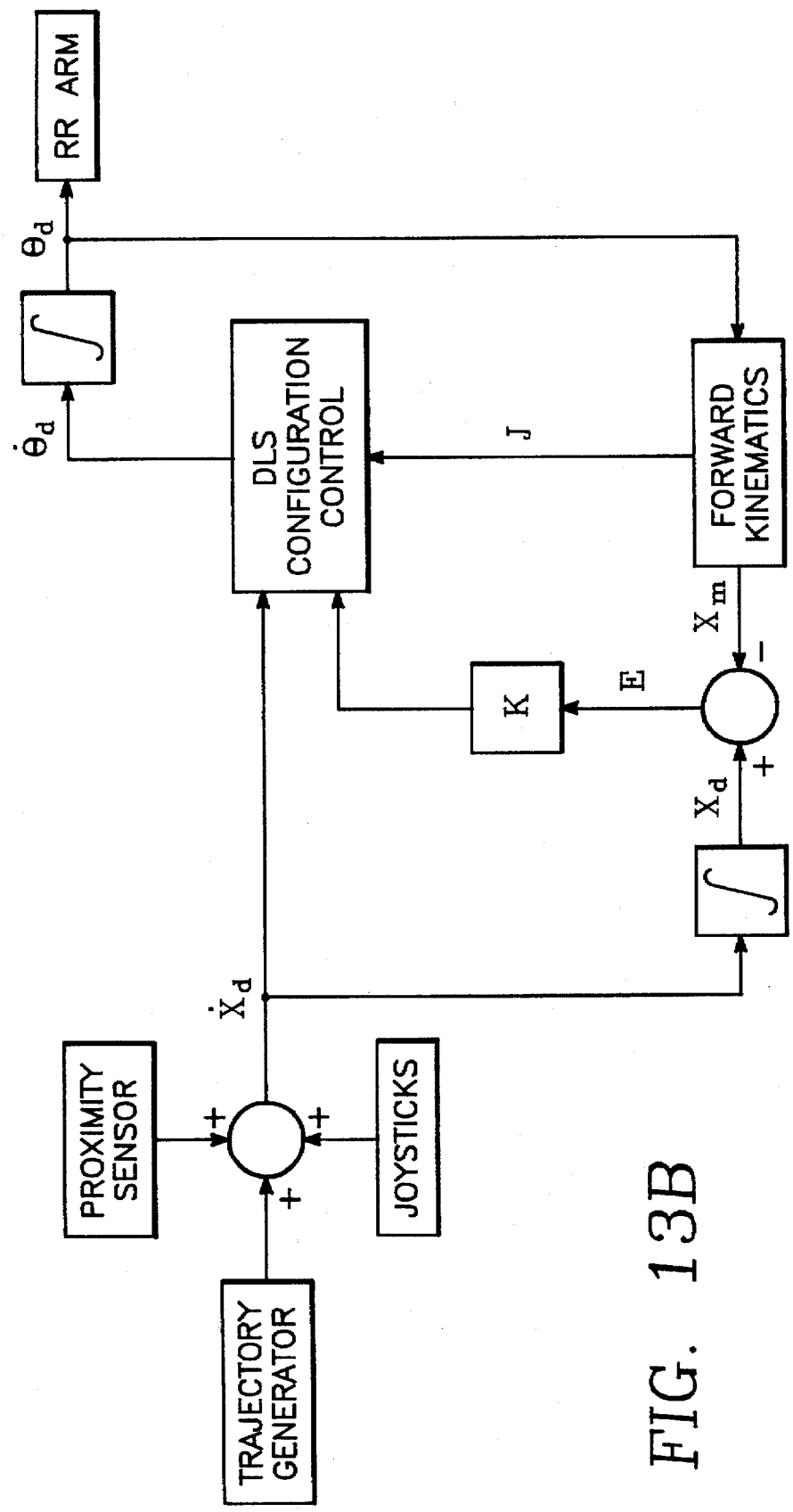
FIG. 13b illustrates a Cartesian control flow diagram for the manipulator.

FIG. 13b illustrates a Cartesian control flow diagram for the manipulator which can be implemented in the VME environment for the seven DOF arm plus the one DOF mobile platform. This allows specification of additional tasks for redundancy resolution. Currently, two choices for the seventh task are available, arm angle control for elbow placement, or obstacle avoidance to reach through an opening. The present invention additionally allows an eighth task with two choices, platform position control, or elbow angle control. The software modules for the control system include the forward kinematics and Jacobian computations, a singularity robust inverse kinematic computation, and a real-time trajectory generation routine.

The computations of the forward kinematics and Jacobian of the 7 DOF manipulator can utilize Craig's interpretation of Denavit-Hartenberg (DH) parameters for frame assignment. This method provides direct computation of the manipulator Jacobian in the world frame of the robot. In addition, the forward kinematics and Jacobian are also computed for the obstacle avoidance task. A singularity-robust inverse kinematics algorithm is implemented and can be the damped-least-squares method. Basically, the method relies on weighting large joint velocities against large task space errors. The resultant computation of the joint velocities has the following form:

$$\dot{\theta}_d = [J^T W_e J + W_v]^{-1} J^T W_e [\dot{X}_d + KE] \quad (20)$$

where $W_e$ and $W_v$ are the task space error weights and joint velocity damping weights, $E = W_d - X$ and K is a diagonal matrix with positive elements. The joint velocities can also be expressed as:

$$\dot{\theta}_d = [J_e^T W_e J_e + J_c^T W_c J_c + W_v]^{-1} [J_e^T W_e \dot{Y}_d + K_e E_e + J_c^T W_c \dot{Z}_d + K_c E_c] \quad (21)$$

where the subscript e refers to the basic task Y of positioning the hand T, and the subscript c refers to additional tasks Z for redundancy resolution. Cholesky decomposition can be used to solve the expression in (2). It can be seen that as the Jacobian becomes singular, the velocity weight dominates in the inverse matrix term in (2), reducing the commanded joint velocities. The reduced joint velocities, in turn, act to retard the arm from reaching the singular configuration.

6. Real-Time Control of the 7 DOF Arm with 1 DOF Mobile Platform

Figure 14:
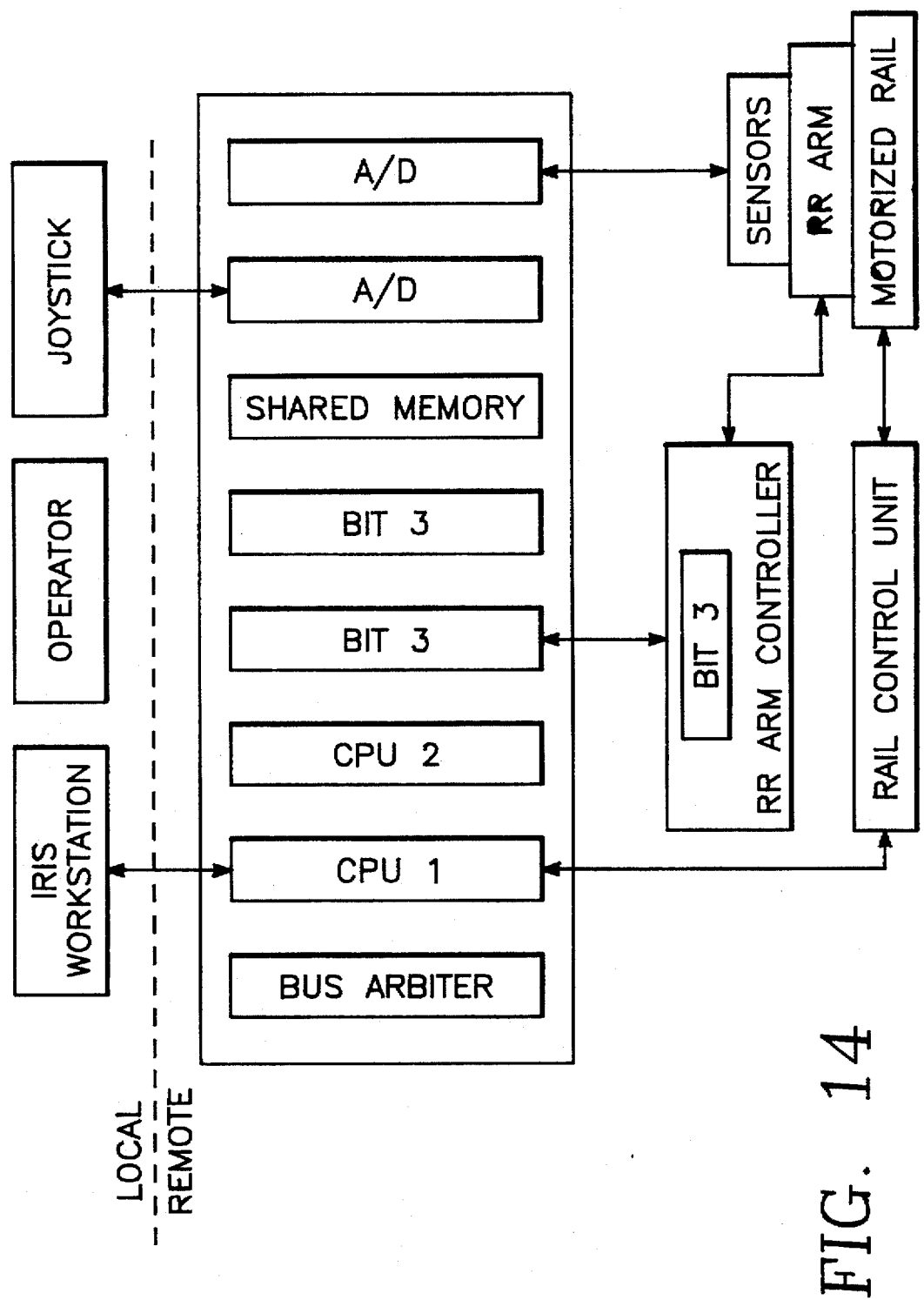
FIG. 14 illustrates the hardware of the 7 DOF Arm with 1 DOF mobile platform.

FIG. 14 illustrates the hardware of the 7 DOF Arm with 1 DOF mobile platform. The manipulator control system (MCS) of FIG. 14 is very similar to FIG. 11 and consists of the seven degree-of-freedom (DOF) arm/control unit, such as the Robotics Research Corporation model K1207, the chassis with processors, such as the VME-based chassis with the two Motorola MC68040 processor boards and additional interface cards, two joysticks, and the workstation, such as a Silicon Graphics IRIS workstation. The VME-bus environment can be running the VxWorks real-time operating system. However, FIG. 14 additionally includes the 1 DOF mobile platform as a motorized rail with associated control unit. The arm is mounted on a motorized servo driven platform with control unit as shown in FIGS. 3, 4a–4d, and 15.

FIG. 14 illustrates the local site interacting with the remote site in a similar fashion as shown in FIG. 11. The remote site sub-system includes the robot with the arm having the integrated sensor/end-effector (ISEE) unit consisting of two CCD cameras with controlled lights, two infrared triangulation-based proximity sensors, a gas sensor, a temperature sensor, and a gripper. Sensor information is received from the integrated sensor/end-effector (ISEE). The remote system additionally includes the mobile platform. The local site consists of an operator control station where the operator resides. This local site can be referred to as the "cupola". Within the cupola is the IRIS workstation, two color monitors, a stereo color monitor, and two joysticks.

The dexterous manipulator of the present invention has seven revolute joints in an alternating roll/pitch sequence beginning with the shoulder roll at the base and ending with the tool-plate roll at the hand. The arm pedestal is mounted on a mobile platform having a motorized rail which provides one additional translational degree-of-freedom that can be treated as a prismatic joint. Therefore, the complete manipulator system has eight independent joint degrees-of-freedom with two degrees-of-redundancy, i.e. two "extra" joints, since six joints are sufficient for the basic task of hand position and orientation in the three-dimensional workspace.

Similar to the system of FIG. 11, FIG. 14 illustrates the arm controlled by the real-time microprocessor-based controller that uses advanced control algorithms for high-level dexterous motion control and interfaces directly with the arm control unit chassis, such as the Multibus chassis unit. The real-time controller can be the VME bus-based system that uses two Motorola MC68040 processors along with various data acquisition, memory, and communication devices. The real-time controller is linked via socket communication to the workstation, which serves as the host computer for the manipulator control interface. The real-time controller also has the shared memory interface allowing a high speed communication link with other systems. A separate image processing real-time chassis, such as the VME chassis uses the interface to monitor the Cartesian position of the end-effector. The real-time chassis and the arm control unit chassis are connected via the two-card real-time chassis to arm control unit, such as the two-card VME-to-Multibus adaptor. This allows a high speed bi-directional shared memory interface between the two buses.

Additionally, FIG. 14 illustrates the robot mounted on a mobile platform with a control unit, such as a motorized platform having a motorized rail, which provides one additional translational degree-of-freedom that can be treated as a prismatic joint. The commands from the workstation to the platform control unit can be communicated through a serial port. The platform control unit is capable of providing very accurate position control (0.012 mm accuracy) of the platform. However, with a serial port link, communication with the platform control unit occurs at a slow rate relative to the arm control unit.

6.1 Two-link Approximation of the 7 DOF Arm with 1 DOF Mobile Platform

Figure 15:
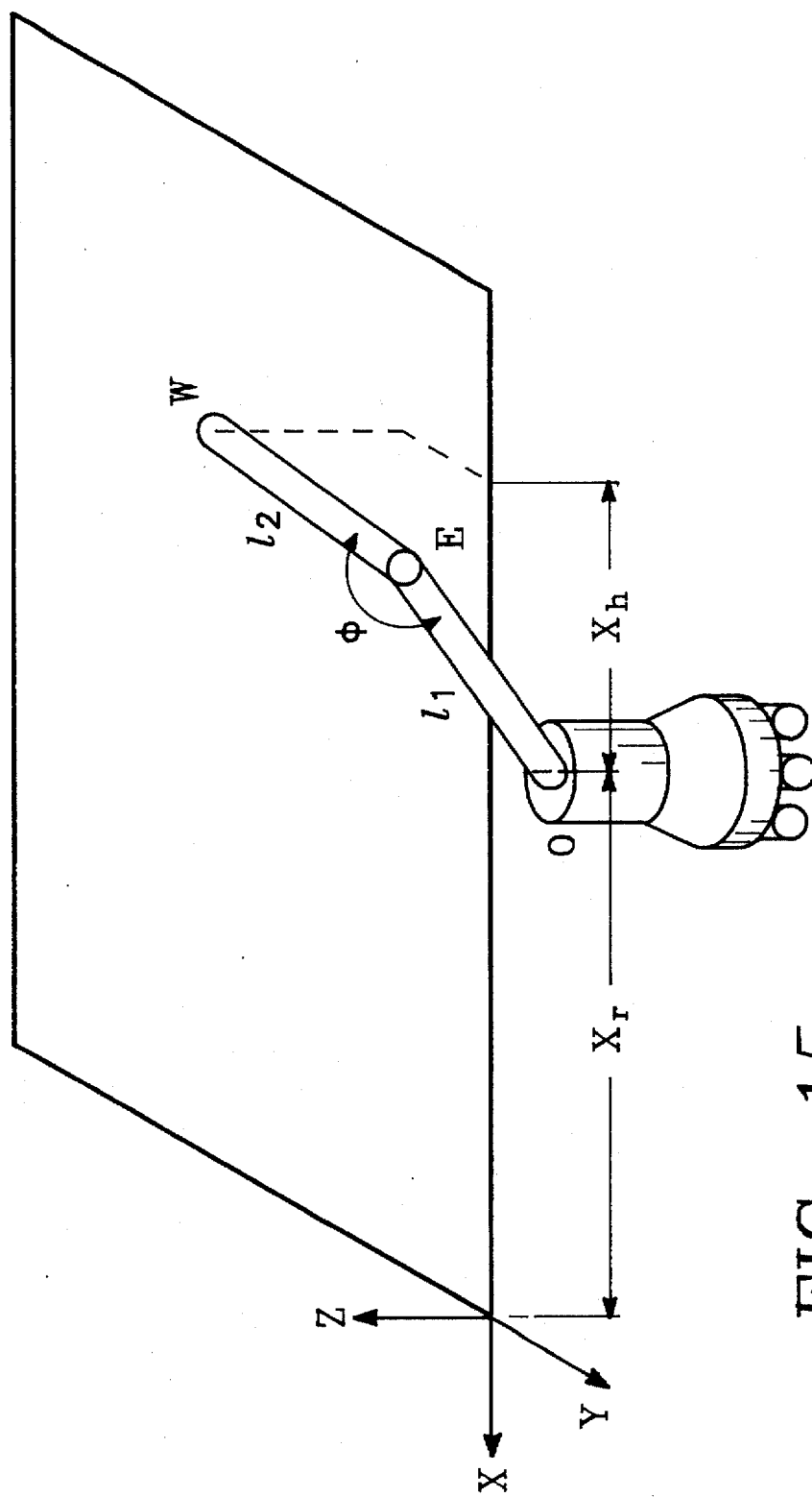
FIG. 15 illustrates a two link approximation of the manipulator with the mobile platform.

FIG. 15 illustrates a two link approximation of the manipulator with the mobile platform. In the configuration control implementation, the "arm angle" is defined as the angle between the arm plane OEW and the vertical plane passing through the line OW, where O, E and W refer to the origins of the shoulder, elbow and wrist frames, respectively. In the control software, a simple and efficient method is used for computing the arm angle and the associated constraint Jacobian. The "elbow angle" or $\phi$, is defined as the angle between the upper-arm, $l_2$, and the forearm, $l_1$. The platform position is defined to be the position of the base of the robot, $x_r$, with respect to a given world frame. The obstacle avoidance task allows the arm to reach through an opening while using the redundancy to avoid collision.

Since communication with the platform control unit occurs at a relatively slow rate with the serial port link connection, and because the platform control unit is currently used as a position controller with no velocity blending between commanded positions, the control system does not treat the platform as a true joint. Instead a scheme is used to mimic an eight DOF control system.

When the eighth task is platform position control, for a given user-specified platform trajectory, the arm controller creates an equal but opposite trajectory for the hand. Since the platform always provides a straight-line trajectory with a trapezoidal velocity profile, the compensating trajectory for the arm is maintained by the platform.

As a result, the hand position is maintained while the platform is moved. If elbow angle control is chosen as the eighth task, instead of specifying an explicit elbow angle, an acceptable range of elbow angles is specified.

Figure 16:
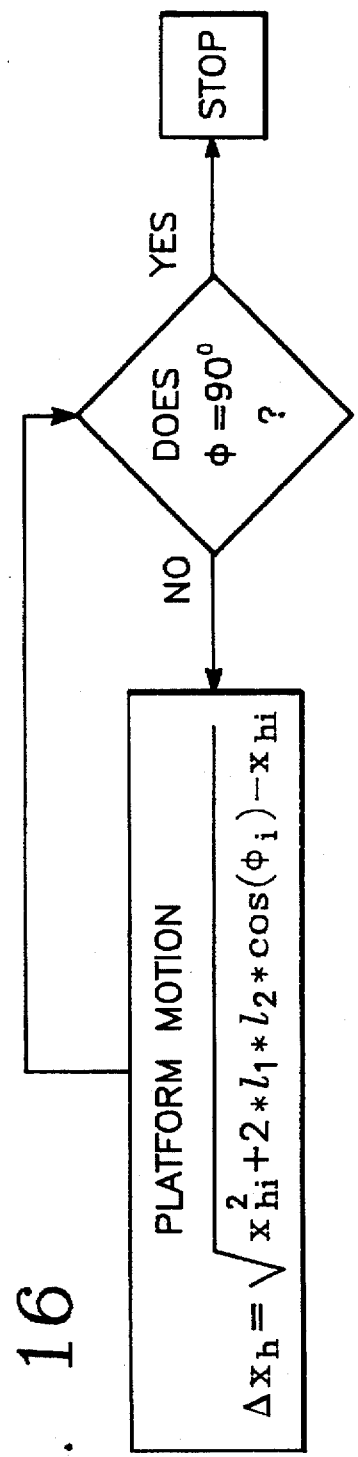
FIG. 16 illustrates the Platform Motion Control routine of FIG. 13a in detail.

FIG. 16 illustrates the Platform Motion Control routine of FIG. 13a in detail. For example, if the user specifies a wedge angle, corresponding to a maximum elbow angle $\phi$, of approximately 90°, the control routine will constantly monitor the elbow angle, $\phi$. If the elbow angle, $\phi$, equals the user specified wedge angle of 90°, a stop command is initiated and the routine returns. However, if the elbow angle, $\phi$, does not equal the user specified wedge angle of 90°, the platform is moved in accordance with a given movement equation. Thus, the platform controller will maintain the elbow angle.

This is accomplished by the control system which moves the elbow angle back to the specified elbow angle, such as 90°, by moving the platform, while compensating for the platform movement with an opposite trajectory for the hand. The control system performs a simplistic computation for the platform movement. For instance, assuming a two-link approximation for the arm, the hand must move by:

$$\Delta x_h = \sqrt{x_{hi}^2 + 2 \ast l_1 \ast l_2 \ast \cos(\phi_i)} - x_{hi} \quad (22)$$

where $x_{hi}$ is the initial hand position relative to the shoulder; $l_1$ and $l_2$ are the upper-arm and forearm lengths, and $\phi_i$ is the initial elbow angle. As a result, the platform is thus commanded to move by $(-\Delta_{x_h})$. The net effect is to leave the hand position constant while placing the elbow angle back to approximately 90°.

Therefore, if the elbow angle moves out of the specified range, the platform controller will bring the elbow angle back to the specified elbow angle, which is 90° in this case. The choice of 90° for an elbow angle maximizes the manipulability of the hand in the arm plane and also maximizes the midrange value of the elbow angle.

For the K1207 arm, acceptable inaccuracies on the order of ±10° is observed. For a typical case, an elbow wedge angle of 30° is used, $60° \geq \phi \geq 120°$, and has been found to be adequate.

6.2 Joint Limit Avoidance

Referring back to FIG. 13b, in addition to the eight tasks described above, an extra task is added for each joint that is near its limit. This is accomplished within the framework of the configuration control scheme as shown in FIG. 13b. When joint limits are approached, the system actually becomes "deficient" (as opposed to being "redundant"). The damped-least-squares algorithm automatically relaxes certain tasks based on their weighting factors. The joint limit avoidance task is formulated as an inequality constraint that is activated only when the joint is within its "soft" limit, and is inactive otherwise. Specifically, $J_\xi^T W_\xi J_\xi = W_\xi$ and $J_\xi^T W_\xi$ reduces to $W_\xi$, where $\xi$ indicates the joint limit avoidance task. Thus, computationally, the joint limit avoidance task is extremely fast.

6.3 Trajectory Generation

Two independent trajectory generators are implemented in the system of the present invention. The first trajectory generator produces smooth continuous cycloidal functions to make the transition from the initial value to the final value in a specified time. A second via-point blending trajectory generator is also implemented in the system. The via-point blending trajectory generator allows the specification of several via-points. The control system generates a smooth trajectory between the points, while smoothly blending the velocities from one viapoint to the next.

6.4 Simulation mode

The control system provides an arm simulation mode in addition to real arm execution mode. During the real arm execution mode, the control system sends the measured joint angles to the workstation, such as IRIS. This ensures that the user views the actual arm configuration since the measured joint angles are used for graphic simulation. In the simulation mode, the control system outputs the joint setpoints to a different shared memory location. Although the commanded joint setpoints are not sent to the arm control unit, the control system transmits the commanded joint setpoints instead of the actual joint angles to the workstation, such as the IRIS. Thus, the implementation of the simulation mode in the control system assures that the simulation will effectively duplicate real arm execution since the same code is executed in both cases.

Figure 17:
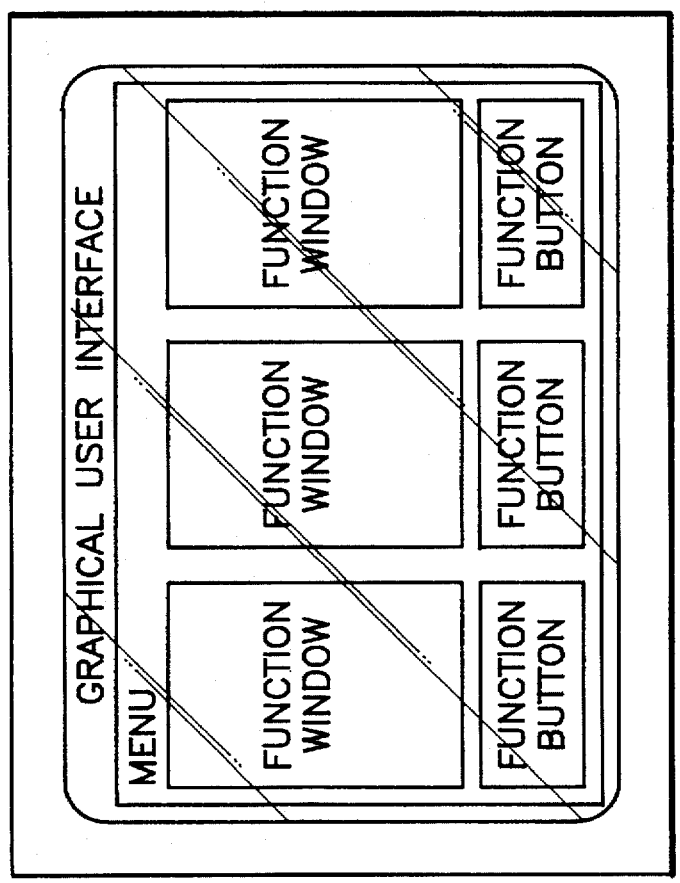
FIG. 17 shows a sample IRIS workstation graphical user interface with windows for manipulator control.

7. Graphics Simulation of 7 DOF Arm with 1 DOF Mobile Platform Manipulator Control Interface FIG. 17 shows a sample IRIS workstation graphical user interface with windows for manipulator control. The manipulator control system has three command mode options, the Teleoperated Command Mode, Automated Command Mode, and Shared Command Mode. The manipulator control interface enables the user to specify the command and control modes of operation, set control system parameters, and determine the manipulator status. The user selects the desired command mode on the appropriate button on the menu of the graphical user interface.

7.1 Teleoperated Command Mode

In the teleoperated command mode, the user employs two industrial joysticks to generate the commanded velocity inputs to the manipulator system. These joysticks can be identical to the joysticks used by astronauts to operate the Remote Manipulator System (RMS) from the Space Shuttle bay. The first joystick has a 3-axis square handle and is used solely to command translation, and the second joystick has a 3-axis rotational grip handle and is used for commanding orientation. The second joystick also has three mounted switches, including a trigger, slide and momentary switch. The trigger switch is used to change the arm angle in one direction at a constant speed. The slide switch is used to move the platform in one direction at a constant speed. The momentary pushbutton switch has dual usage, including changing the direction of both the platform and changing the arm angle commands. The user can select the gains that map the joystick deflections into the arm displacements.

7.2 Automated Command Mode

In the automated command mode, the motion commands to the arm are issued by trajectory generator software in the VME chassis. In this case, the user inputs on the keyboard or the slider bars the desired final values of the hand coordinates and arm angle or the target values of the joint angles, as well as the motion duration.

7.3 Shared Command Mode

The system of the present invention also provides a shared command mode which combines the teleoperated and automated modes. The shared command mode uses commanded values for the arm coordinates are read both from the joystick channel and the trajectory generator channel and added together to form the commanded arm coordinates. The shared command mode of operation is particularly useful in applications where the hand coordinates are moved in automated mode by the trajectory generator software while the user is commanding the elbow motion through the arm angle using the joystick in teleoperated mode.

7.4 Control Modes

The user can also select a Joint Control Mode, Cartesian-World Control Mode, Cartesian-World Relative Control Mode, and Cartesian-Tool Control Mode. The user selects one of the control modes to operate the arm by selecting the appropriate button on the IRIS graphical user interface screen.

Specifically, for the Joint Control Mode, commands are issued to the seven joint angles of the arm and the platform. For the Cartesian-World Control Mode, commands are expressed relative to a fixed user-defined frame of reference (the world frame), for the Cartesian-World Relative Control Mode, motion commands are in the world frame coordinates measured relative to the current world frame coordinates of the hand, for the Cartesian-Tool Control Mode, motion commands are in the end-effector coordinates measured relative to a reference frame displaced by the tool length from the current hand frame. Also, the tool length is defined by the user using the IRIS screen.

The operator of the robot can choose between arm simulation mode or real arm execution mode by selecting the particular mode from the graphical user interface. The choice for the seventh and eighth tasks is made using software toggle buttons. When switching from platform control to elbow angle control, the eighth task parameter in the slider window changes from the platform position to the elbow angle.

The system of the present invention also provides the capability of utilizing the arm redundancy in order to avoid collision with workspace obstacles in tasks such as reaching safely through an opening. When the obstacle avoidance task is activated, the obstacle avoidance window shows the distance of the arm from the center of the opening, and the entry angle. The entry angle is defined as the angle between the arm link entering the opening and the normal to the opening. The sliders display the current values, and the maximum allowable values. When the maximum allowed values are exceeded, the obstacle avoidance task is aborted. The system allows the operator to continue to move the arm, however, the responsibility for obstacle avoidance falls on the operator. The various command and control modes provide considerable flexibility for operation of the robotic arm. The mode of operation can be changed on-line by the user at any time based on the task at hand. The control system greatly increases the up-time of the arm by being robust to singularities and joint limits.

7.5 Software Architecture

Figure 18:
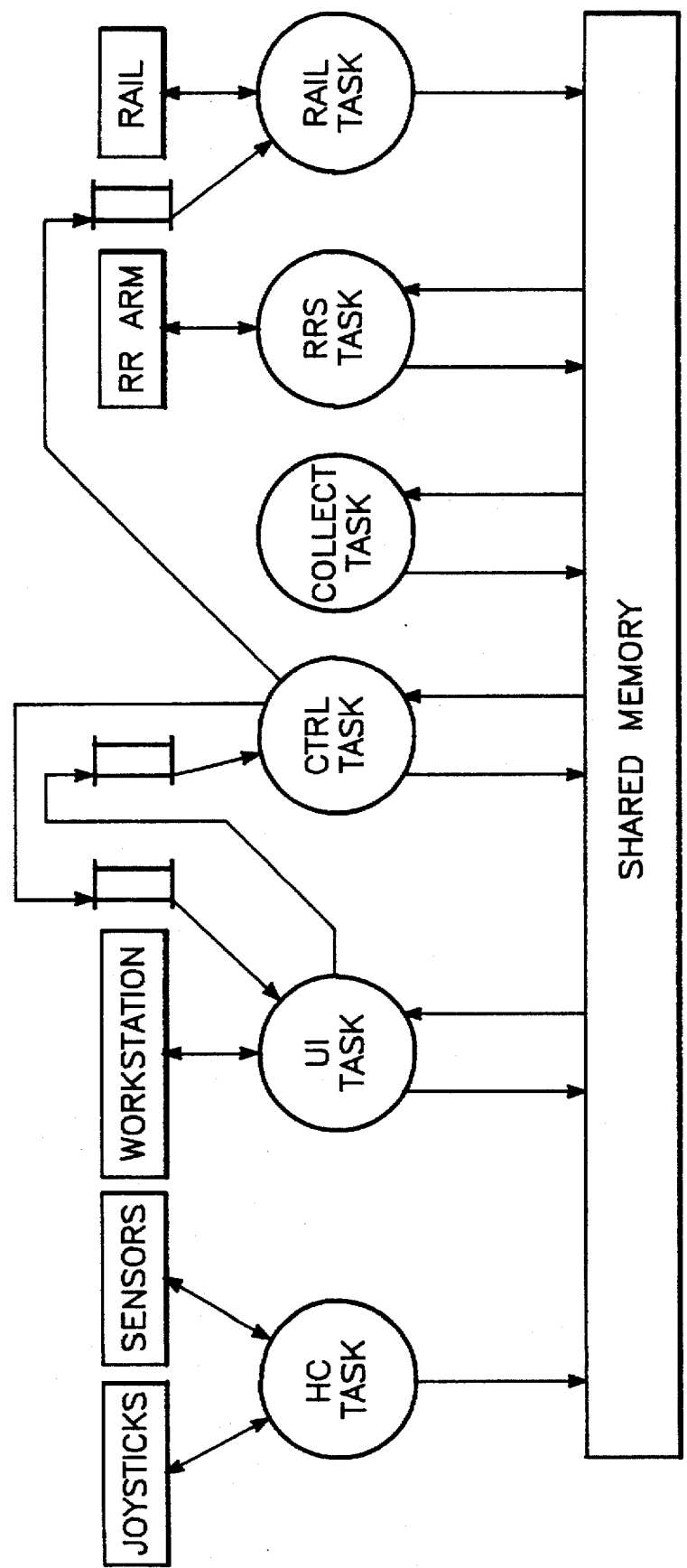
FIG. 18 illustrates a sample software architecture of the system of the present invention operating in a VME environment.

FIG. 18 illustrates a sample software architecture of the system of the present invention operating in a VME environment. One type of software component of the VME environment used for real-time control of the manipulator is preferably written in the C language. Code is developed on a SUN Sparc 10 UNIX computer utilizing Wind River System's VxWorks development environment. The development environment consists of a C compiler, a remote symbolic debugger, and the Stethoscope real-time monitoring tool. The code is downloaded through Ethernet to the target processor boards for execution.

The VME chassis hosts two Motorola MV167 MC68040 CPU cards that perform all the necessary computations to provide real-time control of the manipulator and the base platform. The user interface (ui) task interfaces with the high-level system residing in the IRIS to receive user commands and to send acknowledgment and state information after execution of the commands. The information is routed bi-directionally through Ethernet using the UNIX socket protocol. Once a command is received from the IRIS, the ui task parses the command and then writes appropriate command information onto the shared memory card to pass along to the other tasks. All commands from the IRIS are acknowledged by the controller. Every reply from the controller contains the state of the system which includes information such as sensor data, current joint angles, current mode, and Cartesian task values. The information also includes the current parameters that the system is using such as the elbow wedge angle and the hand controller gains. The state of the controller also indicates whether joint limit tasks are activated, whether the arm power is on, and the current seventh and eighth tasks chosen.

The hand controller (hc) task is designated to perform data acquisition. It controls the activities of the Analog-to-Digital (A/D) converter boards which are used to read in joystick inputs and sensor data. The first A/D board reads in various voltage outputs of the six potentiometers on the joystick. In addition, it monitors the voltages of the three switches on the rotational grip joystick. The second A/D board reads in the sensor data from the temperature sensor, gas sensor, and the two proximity sensors.

The control (ctrl) task performs real-time trajectory generation and kinematic computations. The forward kinematics and Jacobian computations, damped-least-squares computation, and the Cholesky decomposition computation have been timed to take approximately 1.1 ms to complete.

The robotics research servo (rrs) task communicates with the arm control unit at the maximum possible rate of 400 Hz, i.e. every 2.5 ms. Each joint servo motor can be independently commanded in any of the four modes, including position, velocity, torque, and current. This feature enables the operation of the robot under both kinematic and dynamic control schemes, and therefore facilitates validation of a variety of arm control laws. The driver performs all necessary handshakes with the arm control unit software and conversion of data into appropriate formats. In addition, joint position and velocity limits are also checked at each cycle for safety reasons.

The collect task is interconnected to the shared memory and collects data of the robot and the rail, including robot and rail orientations, positioning as well as other pertinent data for effectuating proper movement of the rail. The collect task then sends the collected data to the shared memory for appropriate routing. The rail task is interconnected to the shared memory and the rail and receives data from the ctrl task as rail commands. The rail task computes the data collected to determine how much displacement is required by the rail based on data in the shared memory as well as data received from the rail. The rail task then sends this computed data to the shared memory which is received by the control unit and also sends signals to the rail.

7.6 Experimental Results

Figure 19:
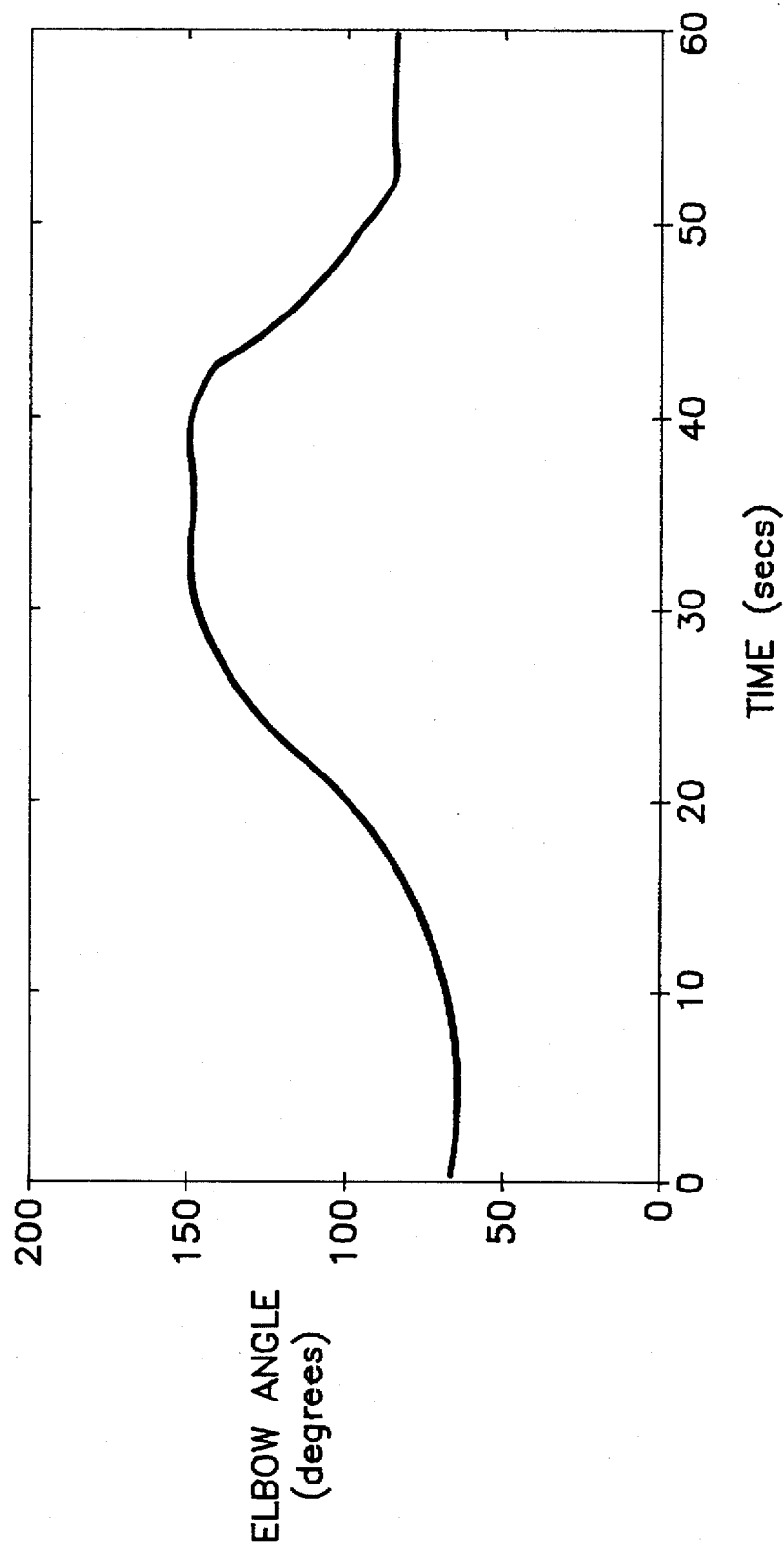
FIG. 19 illustrates the experimental results on the real-time control of the mobile manipulator system of the present invention.

FIG. 19 illustrates the experimental results on the real-time control of the mobile manipulator system of the present invention. These experimental results demonstrate how base mobility can be used to appropriately move the arm in order to reach a target hand position.

The arm was operated in Cartesian world control mode using automated command mode with the via-point blending trajectory generator. The units used internally were meters and radians. The system used task weightings ($W_t$) of 1 and feedback gains (K) of 1 for the end-effector and arm angle control tasks, and joint velocity weightings ($W_v$) of 0.005. The weighting for the joint limit avoidance task ($W_E$) was a cycloidal function that started at 0 when the joint was within 10 degrees of its limit (the "soft limit"), and increased to a maximum of 10 when the joint was within 3.5 degrees of its limit (the "hard limit"). The feedback gain used for the joint limit avoidance task was 1.

Starting from the initial hand position of x=−3.075 m, Y=−0.624 m, and z=1.200 m, the hand was commanded to move to the final position of x=−3.925 m, Y=−0.624 m, and z=0.600 m in 35 seconds. It should be noted that the target hand position was beyond the reach of the arm if base mobility was not activated. The elbow angle control was selected as the eighth task.

FIG. 19 shows that when the elbow angle exceeds 120°, the platform starts to move and brings the elbow angle back to approximately 90°. It should noted that since the hand velocity was greater than the base velocity, the elbow angle exceeded the wedge $60° \geq \phi \geq 120°$ momentarily until the base mobility had sufficient time to compensate for the hand motion. Thus, the base mobility of the arm can be used effectively to prevent the manipulator from reaching its workspace boundary.

8. Conclusions

The problem of motion control of 7 DOF arms is addressed in this paper. To provide dexterous motion of the arm, the configuration control approach is adopted in which the redundancy in joint space is effectively transferred into task space by adding a user-defined kinematic constraint to the end-effector task. The configuration control schemes are robust when singularities are encountered and allow the user to assign appropriate priorities to the task requirements. In this paper, applications of configuration control approach to motion control of the 7 DOF Robotic Research arm are described. Diverse redundancy resolution goals such as elbow control, collision avoidance and optimal joint movement are demonstrated using computer graphics simulations. A simple laboratory experiment on configuration control of the Robotics Research arm is described, and experimental results are presented.

In contrast to Jacobian pseudoinverse methods which resolve the redundancy in joint space, the configuration control approach provides direct control of the manipulator in task space, where the task is performed. Furthermore, unlike pseudoinverse methods, the redundancy resolution goal is not restricted to optimization of a kinematic objective function. Finally, in contrast to pseudoinverse methods which do not ensure cyclicity of motion [22], the configuration control approach guarantees cyclic (i.e., conservative) motions of the manipulator, which is particularly important for repetitive tasks. By way of an example, in a 7 DOF arm under pseudoinverse control, the elbow is allowed to move without restraint during the hand motion, and the arm assumes different configurations for a closed-path hand movement [23]; whereas under configuration control, both of these problems are circumvented.

In addition, the real-time control system for the mobile dexterous seven DOF manipulator of the present invention is well-suited for tasks that demand positioning and pointing a payload dexterously, such as in supervised telerobotic inspection projects. The additional control system for the mobile platform provides dexterous motion by controlling the end-point location and the manipulator posture simultaneously. This enables operation of the manipulator in the presence of workspace obstacles and provides the capability to reach safely inside constricted openings. This yields a general-purpose highly-flexible manipulator control system which is capable of performing many tasks requiring teleoperation and autonomous manipulation in unstructured dynamic environments in both space and terrestrial applications. Further, although the arm control system has been designed for the telerobotic inspection project, it possesses generic capabilities that can be used for many applications utilizing different hardware.

While the invention has been described in detail by specific reference to preferred embodiments thereof, it is understood that variations and modifications may be made without departing from the true spirit and scope of the invention.

APPENDIX A

COPYRIGHT
JET PROPULSION LABORATORY 1995

Apr 20 12:47 1995  railtraj.h Page 1

```
/*
 *
 *
 *      $RCSfile: railtraj.h,v $
 *      $Revision: 1.8 $
 *      $State: Exp $
 *      $Date: 1993/08/20 20:05:42 $
 *      $Author: lim $
 *      $Source: /tmp_mnt/home/lim/work/robot/latest/RCS/railtraj.h,v $
 *      $Locker:  $
 */ ifndef _RAILTRAJ_H_
define _RAILTRAJ_H_

/* function prototypes */ void lathpos(DVECT *pWrist, DVECT *pShoulder, double elbowAngle);
void changeWedgeAngle(double deg);
int railSend(double dxRail);
int railTrajVal(double *dxRail);
void updateRailShmem(double desired_theta[NDOF], double dxRail);
void lath_obst(double dxRail) ;
double railAuto(double dxRail);
void railoff(void);
void haltRailTraj(void);

#endif                          /* ! _RAILTRAJ_H_ */
```

A-2

Apr 20 12:46 1995  railtraj.c Page 1

```c
/*
 *
 *
 *       $RCSfile: railtraj.c,v $
 *       $Revision: 1.21 $
 *       $State: Exp $
 *       $Date: 1993/08/26 16:45:33 $
 *       $Author: lim $
 *       $Source: /tmp_mnt/home/lim/work/robot/latest/RCS/railtraj.c,v $
 *       $Locker:  $
 */
static char RCSid[] = "$Id: railtraj.c,v 1.21 1993/08/26 16:45:33 lim Exp $";
#define USE(var) \
    static void * use_##var = (&use_##var, (void *) &var)
USE (RCSid);

/*#define DEBUG*/

/*
 * routines for calculating the movement of the rail, and the compensating
 * trajectory movement by the robot arm.
 *
 */

/* include files */
#include "options.h"
include <vxWorks.h>
#include <logLib.h>
#include <vxLib.h>
#include <math.h>
#include <taskLib.h>
#include <sysLib.h>
#include <stdio.h>
include <string.h> include "mcs_com.h"
include "cpu_config.h"
#include "ndof.h"
#include "rrkine.h"
#include "shmem.h"
#include "railinit.h"
#include "railtraj.h"
#include "mcs_com.h"
#include "ctrl.h"
#include "msgq.h"

#ifdef DEBUG
#undef LOCAL
#define LOCAL
endif                            /* DEBUG */ define REV_TO_M (.0254 / 5.0)   /* revolutions to meters */
/* rail acceleration in meter/sec**2 */
#define RAIL_ACC (RAIL_ACC_DEFAULT * REV_TO_M)
/* rail velocity in meter/sec */
#define RAIL_VEL (RAIL_VEL_DEFAULT * REV_TO_M)
```

A-3

Apr 20 12:46 1995  railtraj.c Page 2

```c
/*
 * trajectory parameters for rail - to be used by RR arm to compensate for
 * rail movement
 */
typedef struct {
    int flag;                   /* TRUE to add lathebed trajectory */
    unsigned int count;         /* sample index into trajectory */
    unsigned int maxcount;      /* max value for count */
    /* these are trapezoidal/triangular velocity profile parameters */
    unsigned int nRampUp;       /* count < nRampUp during rampup period */
    unsigned int nRampDown;     /* count > nRampDown during ramp down */
    double cSlope;              /* constant (abs) slope for ramp up/down */
    double cLevel;              /* constant slope during level period */
    double cIntercept;          /* constant intercept during ramp down */
    int sign;                   /* sign of delta x */
} RAILTRAJ;

/* static global variables */

LOCAL RAILTRAJ railTraj = {
    FALSE,                      /* flag */
    0,                          /* count */
    0,                          /* maxcount */
    0,                          /* nRampUp */
    0,                          /* nRampDown */
    0.0,                        /* cSlope */
    0.0,                        /* cLevel */
    0.0,                        /* cIntercept */
    1                           /* sign */
};

/* function prototypes */
LOCAL double trajParams(double dx);
LOCAL double checkRailSoftLimit(double railpos, double dxRail);

/*
 * change wedge for elbow angle.
 * INPUT
 *    deg - wedge angle in degrees
 */
void
changeWedgeAngle(double deg)
{
    ctrl_state.elbowWedgeAngle = deg * DEGTORAD;
}

/*
 * routine to check elbowAngle to see if it is within the wedge
 * if not issue commands to move the lathebed, and compensate with
 * robot arm motion
 */
void
lathpos(DVECT *pWrist, DVECT *pShoulder, double elbowAngle)
{
    double wedgeAngle;
```

A-4

Apr 20 12:46 1995  railtraj.c Page 3

```c
    double xWristNew;         /* new location of wrist relative to shoulder*/
    double dxWrist;           /* amount to move the wrist */
    double xWrist;            /* current location of wrist relative to */
                              /* shoulder */ xWrist = pWrist->x - pShoulder->x;
    wedgeAngle = ctrl_state.elbowWedgeAngle;

if ((! railTraj.flag) &&
        (elbowAngle < PIB2 - wedgeAngle || elbowAngle > PIB2 + wedgeAngle)){
        xWristNew = sqrt(xWrist * xWrist +
                        2.0 * MOD_D3 * MOD_D5 * cos(elbowAngle));
        if (xWrist < 0)
            xWristNew = -xWristNew;
        dxWrist = xWristNew - xWrist;
        railAuto(-dxWrist);
#ifdef DEBUG
        logMsg("lathpos DEBUG: dx = %f m\n", dxWrist);
#endif
    }
}

/*
 * compute trajectory time and trajectory parameters of lathebed compensation
 * given distance to move (this is the distance the arm needs to move)
 * dx - distance in meters
 * Returns:
 *   trajectory time in seconds
 */
LOCAL double
trajParams(double dx)
{
    double dt;                /* calculated trajectory time (secs) */
    double tSample;           /* sampling time (secs) */
    double tau1;

/* sample_time is in ms */
    tSample = sample_time * 1.0e-3;
    railTraj.sign = SGN(dx);
    dx = fabs(dx);
    if (dx <= RAIL_VEL * RAIL_VEL / RAIL_ACC){
        /* triangular velocity profile */
        dt = 2.0 * sqrt(dx / RAIL_ACC);
        railTraj.nRampUp = railTraj.nRampDown = dt / (2.0 * tSample);
        railTraj.cLevel = 0.0;   /* unused */
        railTraj.cIntercept = RAIL_ACC * dt * tSample;
    } else {
        /* trapezoidal velocity profile */
        dt = dx / RAIL_VEL + RAIL_VEL / RAIL_ACC;
        tau1 = RAIL_VEL / RAIL_ACC;
        railTraj.nRampUp = RAIL_VEL / (RAIL_ACC * tSample);
        railTraj.nRampDown = (dt - tau1) / tSample + 1;
        railTraj.cLevel = RAIL_VEL * tSample;
        railTraj.cIntercept = (RAIL_VEL + RAIL_ACC * (dt - tau1)) * tSample;
    }
```

A-5

Apr 20 12:46 1995   railtraj.c Page 4

```c
        railTraj.count = 0;
        railTraj.maxcount = dt / tSample + 1;
        railTraj.cSlope = RAIL_ACC * tSample * tSample;
        railTraj.flag = TRUE;
        return(dt);
}

/*
 * compute value of delta x for compensation of rail trajectory.  This is
 * the value of delta x while executing the trajectory.
 * Delta x is cartesian world x movement that the arm should move to compensate
 * for the movement of the rail.
 *
 * returns TRUE if in rail trajectory, FALSE otherwise
 */
int
railTrajVal(double *dxRail)
{
    *dxRail = 0.0;
    if (railTraj.flag){
        mcsAutoFlag++;
        railTraj.count++;
        if (railTraj.count < railTraj.nRampUp){
            /* during ramp up stage */
            *dxRail = (double)railTraj.sign * railTraj.count * railTraj.cSlope;
        } else if (railTraj.count < railTraj.nRampDown){
            /* during level velocity stage */
            *dxRail = railTraj.sign * railTraj.cLevel;
        } else if (railTraj.count < railTraj.maxcount) {
            /* during ramp down stage */
            *dxRail = (double)railTraj.sign *
                (railTraj.count * (- railTraj.cSlope) +
                 railTraj.cIntercept);
        } else {
            /* count >= maxcount */
            railTraj.flag = FALSE;
            mcsAutoFlag--;
        }
    } return(railTraj.flag);
}

/*
 * halt rail trajectory compensation
 */
void
haltRailTraj(void)
{
    railTraj.flag = FALSE;
}

/*
 * Routine to send a command to the rail processor to move the rail, by
 * an amount delta x (in world coordinates). The amount is in meters.
 * Returns:
```

A-6

Apr 20 12:46 1995 railtraj.c Page 5

```c
 *      0 - no error
 *     -1 - error occurred
 */
int
railSend(double dxRail)
{
    RAIL_QDATA rail_data = {MOVE_RAIL, 0.0};

if ((ctrl_status & MCS_SIM_MODE) || (!(ctrl_status & MCS_POWER_ON)))
        return(0);

rail_data.dxRail = dxRail;
    if (msgQSend(rail_qid, (char *)&rail_data, sizeof(rail_data),
                NO_WAIT, MSG_PRI_NORMAL) != OK){
        logMsg("(%s,%d) msgQSend rail_qid failed: %s\n",
                __FILE__, __LINE__, strerror(errno));
        return(-1);
    }
    return(0);
}

/*
 * updates rail position in shmem, also updates desired_theta[7]
 * desired_theta - array to update with rail position
 * dxRail - amount the rail was moved.
 */
void
updateRailShmem(double desired_theta[NDOF], double dxRail)
{
    RAIL_QDATA rail_data = {READ_RAIL, 0.0};
    static int inRailTraj = FALSE; /* TRUE if rail traj in progress */
                                   /* This is used to detect the transition */
                                   /* from railTraj.flag == TRUE to */
                                   /* railTraj.flag == FALSE */
    if ( railTraj.flag ){

/* update desired_theta[7] -> to update present */
        desired_theta[NDOF-1] = present.theta[NDOF-1] + dxRail;

if (!(ctrl_status & MCS_SIM_MODE)){
            /* store actuals in shared memory when the rail is moving */
            /* driver is incapable of doing this right now, so do it here */
            P_BUS(shmem_map->reported.semTheta, sizeof(shmem_map->reported));
            shmem_map->reported.theta[7] = desired_theta[NDOF-1];
            V_BUS(shmem_map->reported.semTheta);
        } inRailTraj = TRUE;
    } else {
        if (inRailTraj){
            /* just ending trajectory */
            inRailTraj = FALSE;
            if (!(ctrl_status & MCS_SIM_MODE)){
                if (msgQSend(rail_qid, (char *)&rail_data, sizeof(rail_data),
                        NO_WAIT, MSG_PRI_NORMAL) != OK){
                    logMsg("(%s,%d) msgQSend rail_qid failed: %s\n",
```

Apr 20 12:46 1995 railtraj.c Page 6

```c
                            __FILE__, __LINE__, strerror(errno));
            }
        }
#ifdef RAIL_ACTUAL
        if (!(ctrl_status & MCS_SIM_MODE)){
            /* read measured values from shared memory */
            /* In could update desired based on what I know I want to move it*/
            /* by, but currently I call railSend() directly from rrAutoMove */
            /* instead of creating a trajectory, so this is simpler for now */
            /* Think of it as using measured values instead of desired */
            P_BUS(shmem_map->reported.semTheta, sizeof(shmem_map->reported));
            desired_theta[7] = shmem_map->reported.theta[7];
            V_BUS(shmem_map->reported.semTheta);
        } else {
            /* update based on where I think it will be */
            /* this should not be needed since by definition dxRail s.b. 0 */
            /* here */
            desired_theta[7] += dxRail;
            if (dxRail != 0)
                logMsg("(%s %d):unexpected dxRail = %f != 0\n",
                    __FILE__, __LINE__, dxRail);
        }
#else
        /* update based on where I think it will be */
        /* this should not be needed since by definition dxRail s.b. 0 here */
        desired_theta[7] += dxRail;
        if (dxRail != 0)
            logMsg("(%s %d):unexpected dxRail = %f != 0\n",
                __FILE__, __LINE__, dxRail);
#endif
        if ((desired_theta[7] <= RAIL_LIMIT_SOFTMIN) ||
            (desired_theta[7] >= RAIL_LIMIT_SOFTMAX))
            ctrl_limit |= MCS_JLIMIT8;
        else
            ctrl_limit &= ~MCS_JLIMIT8;
    }
}

/*
 * move rail via a MOVE_AUTO command
 * dxRail is distance in meters to move the rail
 * Sets up parameters to move arm in the opposite direction
 * Returns:
 *    trajectory time in secs
 *    -1 - if no trajectory initiated
 */
double
railAuto(double dxRail)
{
    double dt = -1.0;
    if (!railTraj.flag){
        dxRail = checkRailSoftLimit(present.theta[7], dxRail);
        /* move rail by dxRail */
        if (railSend(dxRail) != 0){
            logMsg("railAuto railSend failed\n");
```

A-8

Apr 20 12:46 1995  railtraj.c Page 7

```c
            return(0.0);
        }
        /* setup trajectory parameters for RR arm to move */
        dt = trajParams(-dxRail);
    }
    return(dt);
}

/*
 * check soft limits on rail
 * INPUTS:
 *   railpos - current rail position
 *   dxRail - desired amount to move rail
 * RETURNS:
 *   amount to move rail, saturates at joint limit
 */
LOCAL double
checkRailSoftLimit(double railpos, double dxRail)
{
    if (railpos + dxRail > RAIL_LIMIT_SOFTMAX)
        dxRail = RAIL_LIMIT_SOFTMAX - railpos;
    else if (railpos + dxRail < RAIL_LIMIT_SOFTMIN)
        dxRail = RAIL_LIMIT_SOFTMIN - railpos;
    return(dxRail);
}

/*
 * send the STOP_RAIL command
 */
void
railoff(void)
{
    static RAIL_QDATA rail_data = {STOP_RAIL, 0.0};
    if (msgQSend(rail_qid, (char *)&rail_data, sizeof(rail_data),
                NO_WAIT, MSG_PRI_NORMAL) != OK){
        logMsg("(%s,%d) msgQSend rail_qid failed: %s\n",
                __FILE__, __LINE__, strerror(errno));
    }
}
```

A-9

Apr 20 12:46 1995  railinit.h Page 1

```
/*
 *
 *
 *       $RCSfile: railinit.h,v $
 *       $Revision: 1.5 $
 *       $State: Exp $
 *       $Date: 1993/08/30 22:37:53 $
 *       $Author: lim $
 *       $Source: /tmp_mnt/home/lim/work/robot/latest/RCS/railinit.h,v $
 *       $Locker: $
 */

/* values for rail (ROBOT_RAIL). Currently these are never changed */ ifndef _RAILINIT_H_
define _RAILINIT_H_

/*
 * rail joint limits in meters,
 * old rail offset - rail = 0.0 at left limit switch
 *    left limit switch is at rail position = 0.0 meters
 *    right limit switch is at rail position = -1.634 meters
 *    actual max right traverse is -2.060 meters
 * with new rail offset - rail position = 0.0 at world frame
 *    add -1.608361 to all numbers
 */
#if 0
#define RAIL_LIMIT_SOFTMIN -2.02
#define RAIL_LIMIT_SOFTMAX -0.02
#define RAIL_LIMIT_HARDMIN -2.05
#define RAIL_LIMIT_HARDMAX -0.01
#else
#define RAIL_LIMIT_SOFTMIN -3.628361
#define RAIL_LIMIT_SOFTMAX -1.628361
#define RAIL_LIMIT_HARDMIN -3.658361
#define RAIL_LIMIT_HARDMAX -1.618361
endif define RAIL_ACC_DEFAULT  20    /* rail acceleration in rev/sec**2 */
define RAIL_VEL_DEFAULT   4    /* rail velocity in rev/sec */ endif                          /* ! _RAILINIT_H_ */
```

Apr 20 12:46 1995   railRecv.h Page 1

```
/**
 **     Copyright (c) Jet Propulsion Laboratory 1993
 **
 **     $RCSfile: railRecv.h,v $
 **     $Revision: 1.3 $
 **     $State: Exp $
 **     $Date: 1993/08/31 18:44:06 $
 **     $Author: lim $
 **     $Source: /tmp_mnt/home/lim/work/robot/latest/RCS/railRecv.h,v $
 **     $Locker:  $
 **/ ifndef _RAILRECV_H_
define _RAILRECV_H_

STATUS rail_task(void);
void initRail(void);
void show_railpos(void);

#endif                          /* ! _RAILRECV_H_ */
```

A-1.1

Apr 20 12:45 1995  railRecv.c Page 1

```c
/*
 *
 *
 *       $RCSfile: railRecv.c,v $
 *       $Revision: 1.20 $
 *       $State: Exp $
 *       $Date: 1993/09/01 18:46:13 $
 *       $Author: lim $
 *       $Source: /tmp_mnt/home/lim/work/robot/latest/RCS/railRecv.c,v $
 *       $Locker:  $
 */
static char RCSid[] = "$Id: railRecv.c,v 1.20 1993/09/01 18:46:13 lim Exp $";
#define USE(var) \
    static void * use_##var = (&use_##var, (void *) &var)
USE (RCSid);

/*#define DDEBUG*/ include "options.h"
include <vxWorks.h>
#include <taskLib.h>
#include <logLib.h>
#include <stdio.h>
include <string.h>
#include <vxLib.h>
include <sysLib.h> include "cpu_config.h"
include "rrkine.h"
#include "shmem.h"
#include "lath.h"
#include "railinit.h"
#include "railRecv.h"
#include "prio.h"
#include "msgq.h"

#ifdef DDEBUG
#undef LOCAL
#define LOCAL
#endif

/*
 * Interface Routines from shared memory to move the rail
 * There will be a command byte in shared memory which will indicate whether
 * there is a new command to move the rail. This design assumes there
 * is one processor giving commands to the rail and one processor
 * servicing the commands.
 *
 * If the command byte is 0, it is okay to setup the parameters of the move
 *    then the command byte should be set to a nonzero value.
 * The rail processor will monitor the command byte. When it is nonzero
 *    the processor will read the command. After reading the commands
 *    it sets the command byte back to 0 to allow more commands to be sent
 *    It is important that the rail processor reads the commands in and
 *    allows the command buffer to be filled again. I.e. Commands are
 *    buffered and not executed immediately by the rail processor. There
```

A-12

Apr 20 12:45 1995  railRecv.c Page 2

```
 *    is only one slot in the buffer. Thus the rail processor looks like
 *    a device to control the rail.
 * The current command buffer is currently just the amount to move the rail
 * in World relative X coordinates.
 * (Note that currently positive for the rail is negative in world relative x
 * coordinates).
 *
 * After the above interface is working. It should be modified so that
 * the requesting processor send an interrupt to the rail processor. Thus
 * eliminating the polling of the byte by the rail processor which will
 * chew up BUS bandwidth
 *
 * how to know when the lathebed stops moving?
 * request for position (PXA) will not return until movement is finished
 */

/*
 * This file contains code for receiving commands on the rail processor
 */

/*
 * local variables
 */
#ifdef RR_SIM
LOCAL double simRailPos;        /* simulated position of the rail in mm */
endif /*
 * function prototypes
 */
LOCAL STATUS updateRailPos(double *railpos);
LOCAL double checkRailHardLimit(double railpos, double dxRail);

/*
 * entry point
 */
void
initRail(void)
{
    double railpos;
#ifndef RR_SIM
    /* initialize lathebed */
    initialize_lb();
    setRailAcc(RAIL_ACC_DEFAULT, ROBOT_RAIL);
    setRailVel(RAIL_VEL_DEFAULT, ROBOT_RAIL);
#else
    /* initialize railpos */
    simRailPos = 2110.0;        /* mm */
endif /* update shared memory with rail position */
    if (updateRailPos(&railpos) != OK){
        logMsg("(%s,%d):Error reading rail - is it turned on?\n",
            __FILE__, __LINE__);
        FOREVER
            taskDelay(100);
```

A-13

Apr 20 12:45 1995  railRecv.c Page 3

```c
    } ifndef RR_SIM
    disableLimit(ROBOT_RAIL, CW_LIMIT);
#endif
    taskSpawn("rail_task", RAIL_PRIO, VX_FP_TASK, RAIL_STACK, rail_task);
}

/*
 * Routine run on rail processor to wait for commands and service them
 */
STATUS
rail_task(void)
{
    double railpos;
    double dxRail;              /* amount to move robot rail */
    unsigned int counter = 0;
    RAIL_QDATA rail_data;
    int msgStat;                /* stat of msgQReceive */ updateRailPos(&railpos);
    FOREVER {
        counter++;
        msgStat = msgQReceive (rail_qid, (char *)&rail_data,
                               sizeof(RAIL_QDATA), WAIT_FOREVER);
        if (msgStat == ERROR){
            logMsg("SI_command_receive msgQReceive error:%s\n",
                   strerror(errno));
        } else if (msgStat != sizeof(RAIL_QDATA)){
            logMsg("(%s,%d) msgStat = %d s.b. %d\n",
                   __FILE__, __LINE__, msgStat, sizeof(RAIL_QDATA));
        }
        switch(rail_data.cmd){
        case MOVE_RAIL:
            dxRail = rail_data.dxRail;
            /* execute move */
            /* X coordinate system for rail is opposite of World X, so */
            /* negate also need to convert to millimeters */
#ifdef DDEBUG
            logMsg("moveRail called with %f\n", -dxRail * 1000.0);
#endif
            dxRail = checkRailHardLimit(railpos, dxRail);
#ifdef RR_SIM
            simRailPos -= dxRail * 1000.0;
#else
            moveRail(-dxRail * 1000.0, ROBOT_RAIL);
#endif
            break;
        case READ_RAIL:
            /* read position and store in shared memory */
            updateRailPos(&railpos);
            break;
        case STOP_RAIL:
#ifndef RR_SIM
            stopRail();
#endif
```

A-14

Apr 20 12:45 1995 railRecv.c Page 4

```c
            taskDelay (sysClkRateGet ()); /* delay for one second */
            break;
        default:
            logMsg("Unknown command %d\n", rail_data.cmd);
            break;
        }
    }
    return(ERROR);
}

/*
 * update shared memory with rail position
 * returns current position of the rail
 */
LOCAL STATUS
updateRailPos(double *railpos)
{
    double pos;

#ifdef RR_SIM
    *railpos = simRailPos;
#else
    /* read starting position of rail */
    if ( read_position(ROBOT_RAIL, &pos) == OK){
        *railpos = pos;
    } else {
        logMsg("%s,%d:read_position returned ERROR\n", __FILE__, __LINE__);
        return(ERROR);
    }
endif /* convert x to -x because lathebed x is opposite of world x */
    /* read_position returns mm, convert to m */
    *railpos = - *railpos / 1000.0;

/* store actuals in shared memory */
    P_BUS(shmem_map->reported.semTheta, sizeof(shmem_map->reported));
    shmem_map->reported.theta[7] = *railpos;
    V_BUS(shmem_map->reported.semTheta);

#ifdef DDEBUG
    logMsg("updateRailPos pos = %f\n", *railpos);
#endif
    return(OK);
}

/*
 * check hard limits on rail
 * INPUTS:
 *   railpos - current rail position
 *   dxRail - desired amount to move rail
 * RETURNS:
 *   amount to move rail, saturates at joint limit
 */
LOCAL double
checkRailHardLimit(double railpos, double dxRail)
```

A-15

Apr 20 12:45 1995 railRecv.c Page 5

```c
{
    if (railpos + dxRail > RAIL_LIMIT_HARDMAX)
        dxRail = RAIL_LIMIT_HARDMAX - railpos;
    else if (railpos + dxRail < RAIL_LIMIT_HARDMIN)
        dxRail = RAIL_LIMIT_HARDMIN - railpos;
    return(dxRail);
}

/*
 * debugging routine
 */
void
show_railpos(void)
{
    double railpos = -1;

P_BUS(shmem_map->reported.semTheta, sizeof(shmem_map->reported));
    railpos = shmem_map->reported.theta[7];
    V_BUS(shmem_map->reported.semTheta);
    printf("show_railpos: reported.theta[7] = %f\n", railpos);

P_BUS(shmem_map->reported.sem, sizeof(shmem_map->reported));
    railpos = shmem_map->reported.position[7];
    V_BUS(shmem_map->reported.sem);
    printf("show_railpos: reported.position[7] = %f\n", railpos);
}
```

What is claimed is:

1. A method of controlling a robot arm, said robot arm comprising a base with a central axis, n joints, joint angle sensor means connected to each of said joints, joint servo loop means connected to each of said joints, and two ends comprising a mobile platform end having two degrees-of-redundancy and a movable hand end, each of said joints having a joint angle specifying a rotational orientation of said joint, said hand end having m degrees of freedom of movement, wherein m is less than n and said robot arm is characterized by a degree of redundancy, said method comprising:

first defining a first m-by-n matrix for defining location and orientation of said hand end in terms of said rotation angles of said joints;

second defining a second r-by-n matrix for defining r user-specified kinematic functions in terms of said joint angles, wherein r is a positive integer exceeding to the degree of redundancy of said robot arm;

combining said first and second matrices to produce an augmented m+r-by-n matrix;

computing in accordance with forward kinematics from said augmented m+r-by-n matrix and from the joint angles sensed by said joint angle sensor means a set of n desired joint angles and transmitting said set of n desired joint angles to said joint servo loop means to control the robot arm;

defining a translational position of said mobile platform end from said central axis of said base; and controlling said translational position of said mobile platform end by a platform motion controller.

2. The method of claim 1 wherein each of said kinematic functions defines a constraint in one of (a) location, (b) orientation and (c) configuration of a specified portion of said arm.

3. The method of claim 1 wherein said first m-by-n matrix, second r-by-n matrix and augmented m+r-by-n matrix comprise Jacobian matrices.

4. The method of claim 1 wherein said robot arm has an anthropomorphic structure and one of said joint is an elbow joint, wherein a pair of links of said arm joined together by said elbow joint define an elbow plane of said arm, wherein one of said kinematic functions comprises means for defining an orientation of said elbow plane, and wherein said platform motion controller comprises means for preselecting a wedge angle corresponding to said elbow plane and means for monitoring said orientation of said elbow plane.

5. The method of claim 4, further comprising, by said platform motion controller, the steps of:

(a) defining an initial hand end position, $x_{hi}$, of said robot arm;

(b) defining an initial orientation of said elbow plane, $\phi_i$;

(c) defining lengths $l_1$ and $l_2$, respectively, of said pair of links; and (e) commanding said mobile platform to move $-\Delta_{x_h}$ if said elbow plane does not equal said preselected wedge angle so that said elbow plane orientation returns to said preselected wedge angle and said hand position remains constant, wherein:

$$\Delta x_h = \sqrt{x_{hi}^2 + 2*l_1*l_2*\cos(\phi_i)} - x_{hi}.$$

6. The method of claim 1 wherein at least one of said kinematic functions constrains location of said arm.

7. The method of claim 1 wherein at least one of said kinematic functions minimizes a sum of selected mechanical parameters of at least some of said joints.

8. The method of claim 7 wherein said parameters comprising different weighting coefficients for different ones of said joints.

9. The method of claim 8 further changing said weighting coefficients during movement of said arm.

10. The method of claim 7 wherein said one of mechanical parameters comprises velocity errors of said joints with respect to desired velocities.

11. The method of claim 7 wherein one of said mechanical parameters comprises joint angle errors with respect to desired joint angles.

12. The method of claim 9 wherein at least one of said user-specified functions corresponds to one of:

i. joint limit avoidance;

ii. trajectory generation;

iii. arm simulation.

13. The method of claim 12 wherein said joint limit avoidance comprises the steps of:

(a) initiating said platform motion controller if each of said joints are near their respective positional limits; and (b) relaxing movement of said joints based on respective weighting coefficients of said joints when one of said joints are near their respective positional limits so that each joint is not at a maximum positional limit.

14. The method of claim 12 wherein said trajectory generation comprises two independent trajectory generators, the first trajectory generator producing smooth continuous cycloidal functions so that transition from an initial value to a final value is made in a specified time, and a second trajectory generator specifying a plurality of via-points so that a smooth trajectory between points is generated and velocities between said via-points are smoothly blended.

15. The method of claim 5 wherein said arm simulation exactly duplicates said actual arm movements.

16. A method of controlling a robot arm, said robot arm comprising a base with a central axis, n joints, a joint angle sensor device connected to each of said joints, a joint servo loop device connected to each of said joints, and two ends comprising a mobile platform end and a movable hand end, each of said joints having a joint angle specifying a rotational orientation of said joint, said hand end having m degrees of freedom of movement, wherein m is less than n and said robot arm is characterized by a degree of redundancy, n–m, said method comprising:

first defining a first m-by-n matrix for defining location and orientation of said hand end in terms of said rotation angles of said joints;

second defining a second r-by-n matrix for defining r user specified kinematic functions in terms of said joint angles, wherein r is a positive integer exceeding the degree of redundancy of said robot arm, and wherein at least one of said kinematic functions minimizes a sum of selected mechanical parameters of at least some of said joints and said selected mechanical parameters include different weighting coefficients for different ones of said joints, said weighting coefficients being able to be changed during movement of said arm;

combining said first and second matrices to produce an augmented m+r-by-n matrix;

computing in accordance with forward kinematics from said augmented m+r-by-n matrix and from the joint angles sensed by said joint angle sensor device a set of n desired joint angles and transmitting said set of n desired joint angles to said joint servo loop device to control the robot arm;

defining a translational position of said mobile platform end from said central axis of said base; and controlling said translational position of said mobile platform end by a platform motion controller.

17. The method of claim 16 wherein said robot arm has an anthropomorphic structure and one of said joint is an elbow joint, wherein a pair of links of said arm joined together by said elbow joint define an elbow plane of said arm, wherein one of said kinematic functions comprises means for defining an orientation of said elbow plane, and wherein said platform motion controller comprises means for preselecting a wedge angle corresponding to said elbow plane and means for monitoring said orientation of said elbow plane.

18. The method of claim 17, further comprising, by said platform motion controller, the steps of:

(a) defining an initial hand end position, $x_{hi}$, of said robot arm;

(b) defining an initial orientation of said elbow plane, $\phi_i$;

(c) defining lengths $l_1$ and $l_2$, respectively, of said pair of links; and (e) commanding said mobile platform to move $-\Delta x_h$ if said elbow plane does not equal said preselected wedge angle so that said elbow plane orientation returns to said preselected wedge angle and said hand position remains constant, wherein:

$$\Delta x_h = \sqrt{x_{hi}^2 + 2*l_1*l_2*\cos(\phi_i)} - x_{hi}.$$

19. The method of claim 16 wherein at least one of said kinematic functions constrains location of said arm.

20. A method of controlling a robot arm said robot arm comprising a base with a central axis, n joints, joint angle sensor means connected to each of said joints, joint servo loop means connected to each of said joints, and two ends comprising a fixed pedestal end and a movable hand end, each of said joints having a joint angle specifying a rotational orientation of said joint, said hand end having m degrees of freedom of movement, wherein m is less than n and said robot arm is characterized by a degree of redundancy, n–m, said method comprising:

first defining a first m-by-n matrix for defining location and orientation of said hand end in terms of said rotation angles of said joints;

second defining a second r-by-n matrix for defining r user specified kinematic functions in terms of said joint angles, wherein r is a positive integer exceeding the degree of redundancy of said robot arm, and wherein at least one of said kinematic functions corresponds to one of, i. minimizing a sum of gravitational torques on at least some of said joints, ii. minimizing a sum of selected mechanical parameters of at least some of said joints, said parameters comprising velocity errors of said joints with respect to desired velocities, and iii. minimizing a sum of selected mechanical parameters of at least some of said joints, said parameters comprising joint angle errors with respect to desired joint angles;

combining said first and second matrices to produce an augmented m+r-by-n matrix;

computing in accordance with forward kinematics from said augmented m+r-by-n matrix and from the joint angles sensed by said joint angle sensor means a set of n desired joint angles and transmitting said set of n desired joint angles to said joint servo loop means to control the robot arm;

defining a translational position of said mobile platform end from said central axis of said base; and controlling said translational position of said mobile platform end by a platform motion controller.

21. The method of claim 20 wherein said computing operates in successive iterations, said joint angles sensed by said joint angle sensor means correspond to a current one of said iterations and said set of n desired joint angles correspond to a next one of said iterations.

22. The method of claim 21 wherein said first m-by-n matrix, second r-by-n matrix and augmented m+r-by-n matrix comprise Jacobian matrices.

23. The method of claim 21 wherein said selected mechanical parameters further include different weighting coefficients for different ones of said joints.

24. The method of claim 23 further changing said weighting coefficients during movement of said arm.

25. The method of claim 20 further comprising the steps of:

(a) operating said arm with a teleoperated commands;

(b) providing automated commands issued by a trajectory generator; and (c) combining said teleoperated commands with said automated commands so said arm can be collectively operated by said teleoperated commands and said automated commands.

26. The method of claim 1 further comprising the step of performing said defining, combining, computing, and controlling steps continuously and in real-time, wherein said robot arm operates and performs said steps simultaneously.

27. The method of claim 16 further comprising the step of performing said defining, combining, computing, and controlling steps continuously and in real-time, wherein said robot arm operates and performs said steps simultaneously.

28. The method of claim 20 further comprising the step of performing said defining, combining, computing, and controlling steps continuously and in real-time, wherein said robot arm operates and performs said steps simultaneously.

29. A method of controlling a robot arm in real-time, said robot arm comprising a base with a central axis, n joints, joint angle sensor means connected to each of said joints, joint servo loop means connected to each of said joints, and two ends comprising a mobile platform end and a movable hand end, each of said joints having a joint angle specifying a rotational orientation of said joint, said hand end having m degrees of freedom of movement, wherein m is less than n and said robot arm is characterized by a degree of redundancy, said method comprising:

first defining a first m-by-n matrix for defining location and orientation of said hand end in terms of said rotation angles of said joints;

second defining a second r-by-n matrix for defining r user-specified kinematic functions in terms of said joint angles, wherein r is a positive integer exceeding to the degree of redundancy of said robot arm;

combining said first and second matrices to produce an augmented m+r-by-n matrix;

computing in accordance with forward kinematics from said augmented m+r-by-n matrix and from the joint angles sensed by said joint angle sensor means a set of n desired joint angles and transmitting said set of n desired joint angles to said joint servo loop means to control the robot arm; and performing said defining, combining, and computing steps continuously and in real-time, wherein said robot arm operates and performs said steps simultaneously.

30. A robot arm for operating in a work envelope and performing tasks, comprising:

a base with a central axis and n joints;

a joint angle sensor device connected to each of said joints;

joint servo loop means connected to each of said joints;

two ends comprising a mobile platform end and a movable hand end;

wherein each of said joints has a joint angle specifying a rotational orientation of said joint, wherein said hand end has m degrees of freedom of movement, wherein m is less than n, and wherein said robot arm is characterized by a degree of redundancy;

means for defining a first m-by-n matrix for defining location and orientation of said hand end in terms of said rotation angles of said joints;

means for defining a second r-by-n matrix for defining r user-specified kinematic functions in terms of said joint angles, wherein r is a positive integer exceeding to the degree of redundancy of said robot arm;

means for combining said first and second matrices to produce an augmented m+r-by-n matrix; and means for computing in accordance with forward kinematics from said augmented m+r-by-n matrix and from the joint angles sensed by said joint angle sensor device a set of n desired joint angles and transmitting said set of n desired joint angles to said joint servo loop means to control the robot arm.

31. The method of claim 30, wherein said robot arm is controlled continuously and in real-time so that said robot arm operates and performs tasks simultaneously.

* * * * *

UNITED STATES PATENT AND TRADEMARK OFFICE
CERTIFICATE OF CORRECTION

PATENT NO. : 5,737,500
DATED : April 7, 1998
INVENTOR(S) : Seraji, et al

It is certified that error appears in the above-indentified patent and that said Letters Patent is hereby corrected as shown below:

On the title page, item [54] and Column 1, in the title, "SIREN" should read -- SEVEN --

Signed and Sealed this

Eighteenth Day of August, 1998

*Attest:*

BRUCE LEHMAN

*Attesting Officer*   *Commissioner of Patents and Trademarks*